United States Patent
Mihailov et al.

(10) Patent No.: US 7,379,643 B2
(45) Date of Patent: May 27, 2008

(54) OPTICAL FIBER SENSOR BASED ON RETRO-REFLECTIVE FIBER BRAGG GRATINGS

(75) Inventors: Stephen J. Mihailov, Kanata (CA); Dan Grobnic, Ottawa (CA); Christopher Smelser, Ottawa (CA); Robert Walker, Spencerville (CA); Ping Lu, Ottawa (CA); Huimin Ding, Nepean (CA); George Henderson, Ottawa (CA); Xiaoli Dai, Ottawa (CA)

(73) Assignee: Her Majesty the Queen in Right of Canada as represented by the Minister of Industry, through the Communications Research Centre Canada, Ottawa, Ontario (CA)

( * ) Notice: Subject to any disclaimer, the term of this patent is extended or adjusted under 35 U.S.C. 154(b) by 0 days.

(21) Appl. No.: 11/243,193

(22) Filed: Oct. 5, 2005

(65) Prior Publication Data

US 2006/0029322 A1    Feb. 9, 2006

Related U.S. Application Data

(63) Continuation-in-part of application No. 11/104,545, filed on Apr. 13, 2005, which is a continuation-in-part of application No. 10/803,890, filed on Mar. 19, 2004, now Pat. No. 7,031,571, which is a continuation-in-part of application No. 10/639,486, filed on Aug. 13, 2003, now Pat. No. 6,993,221.

(60) Provisional application No. 60/545,949, filed on Feb. 20, 2004, provisional application No. 60/616,838, filed on Oct. 8, 2004, provisional application No. 60/561,882, filed on Apr. 14, 2004, provisional application No. 60/634,547, filed on Dec. 10, 2004, provisional application No. 60/456,184, filed on Mar. 21, 2003.

(30) Foreign Application Priority Data

| Aug. 1, 2003 | (CA) | .................. 2436499 |
| Nov. 26, 2003 | (EP) | .................. 03405845 |
| Mar. 19, 2004 | (CA) | .................. 2461368 |
| Mar. 22, 2004 | (EP) | .................. 04405172 |

(51) Int. Cl.
*G02B 6/04* (2006.01)
(52) U.S. Cl. ............................. 385/120; 385/12
(58) Field of Classification Search ............. 385/37, 385/12, 13, 120
See application file for complete search history.

(56) References Cited

U.S. PATENT DOCUMENTS

| 5,381,229 | A | 1/1995 | Murphy et al. |
| 6,442,305 | B1 * | 8/2002 | Starodubov et al. .......... 385/13 |
| 2005/0008044 | A1 * | 1/2005 | Fermann et al. .............. 372/19 |
| 2006/0146909 | A1 * | 7/2006 | Morse et al. ................ 374/130 |

OTHER PUBLICATIONS

EP 1 460 459, "Bragg Grating and Method of Producing a Bragg Grating Using an Ultrafast Laser", filed Nov. 26, 2003, Mihailov et al.

(Continued)

*Primary Examiner*—Ellen Kim
(74) *Attorney, Agent, or Firm*—Teitelbaum & MacLean; Neil Teitelbaum; Doug MacLean

(57) ABSTRACT

A retro-reflective sensor for sensing mechanical, chemical or temperature related information, is disclosed. The sensor is formed of an optical waveguide suitable for use in-situ in a high temperature environment having a Bragg grating written into a core region thereof with short-pulsed electromagnetic radiation, said optical waveguide having a glass transition temperature substantially higher than that of silica. Preferably the sensor is written into a length of sapphire fiber or within a zirconium waveguide. Preferably the pulse duration of the short pulsed electromagnetic radiation is less than 500 picoseconds.

16 Claims, 24 Drawing Sheets

OTHER PUBLICATIONS

"Fabricating in Fiber Gratings in Single Crystal Sapphire Fiber", Nam et al, Components and Materials, Proceedings of SPIE Optical, vol. 5350, Jan. 26, 2004, pp. 58-59 and 61-63.

WO 01/35136 A1, "Mode Adaption for Multimode Optical Fiber Systems", Harshbarger et al, May 17, 2001.

"Sapphire Fiber Bragg Grating Sensor Made Using Femotosecond Laser Radiation for Ultrahigh Temperature Applications", Grobnic et al, IEEE Photonics Tech. Ltrs, vol. 16, No. 11, Nov. 2004, pp. 2505-2507.

"Bragg Gratings Written in All-SiO2 and Ge-Doped Core Fibers with 800-nm Femtosecond Radiation and a Phase Mask", Mihailov et al, Journal of Lightwave Technology, vol. 22, No. 1 Jan. 1, 2004.

"Growth of High-quality Y2 O3-ZrO2 Single Crystal Optical Fibers for Ultra-high-temperature Fiber-optics Sensors", Tong, Journal of Crystal Growth vol. 217, No. 3, Aug. 1, 2000, pp. 281-286.

"Wavelength Demodulated Bragg Grating Fiber Optic Sensing Systems for Addressing Smart Structure Critical Issues", Measures et al, Smart Materials and Structures, No. 1. No. 1, Mar. 1, 1992.

"Writing Waveguides in Glass with a Femtosecond Laser" Davis et al, Optics Ltrs, vol. 21, No. 21, Nov. 21, 1996, pp. 1729-1731.

"Study of Damage in Fused Silica Induced by Ulta-short IR Laser Pulses", Sudrie et al, Opt. Comm., vol. 191, No. 3-6, May 8, 2001, pp. 333-339.

"Tapered Single-Mode Fibres and Devices", Love et al, IEEE Proceedings, Journal vol. 138, No. 5, p. 343-354, Oct. 1991.

* cited by examiner

OPTICAL FIBER SENSOR BASED ON RETRO-REFLECTIVE FIBER BRAGG GRATINGS

CROSS-REFERENCE TO RELATED APPLICATIONS

The present application is a continuation in part of U.S. patent application Ser. No. 10/803,890 filed Mar. 19, 2004 now U.S. Pat. No. 7,031,571, which is a continuation in part of U.S. patent application Ser. No. 10/639,486 filed Aug. 13, 2003 now U.S. Pat. No. 6,993,221, which claims priority from U.S. patent application Ser. No. 60/456,184 filed Mar. 21, 2003 and patent application Ser. No. 10/803,890 also claims priority from U.S. patent application Ser. No. 60/545,949 filed Feb. 20, 2004 and from Canadian Application 2,436,499 filed Aug. 1, 2003 and from European Application 03405845.3 filed Nov. 26, 2003, and the present application is also a continuation in part of U.S. patent application Ser. No. 11/104,545 filed Apr. 13, 2005, which claims priority from U.S. patent application Ser. No. 60/616,838 filed Oct. 8, 2004 and from U.S. patent application Ser. No. 60/561,882 filed Apr. 14, 2004 and from U.S. patent application Ser. No. 60/634,547 filed Dec. 10, 2004, which are all incorporated herein by reference for all purposes.

FIELD OF THE INVENTION

The present invention relates to a sensing apparatus and method for measurement of pressure, strain, temperature, or displacement or index of refraction of a high temperature environment and more particularly to a fiber Bragg grating sensor inscribed therein capable of measuring temperature, strains, and environment at temperatures over the glass transition temperature for silica, for example at or above 1300° C. and in some instances above 2000° C. The invention also relates to a preferred method of writing retro-reflective structures such as Bragg gratings directly into the core of sapphire fibers or other structures having a very high glass transition temperatures about or exceeding 2000° C.

BACKGROUND OF THE INVENTION

Fiber Bragg grating sensors (FBG sensors) have attracted considerable attention in sensing temperature and strain on an optical fiber due to the variation in the spectral response of the grating as a result of strain and temperature on the grating structure. These FBG sensors offer important advantages such as electrically passive operation, EMI immunity, high sensitivity and multiplexing capabilities. Fiber gratings are simple, intrinsic sensing elements which traditionally have been UV photo-inscribed into photosensitive Ge-doped silica fiber. Each FBG sensor has a characteristic retro-reflective Bragg resonance or Bragg wavelength, which is dependent upon the periodicity of the grating within the fiber and the effective refractive index of the fiber. The FBG sensors can then easily be multiplexed in a serial fashion along a length of single fiber. When embedded into composite materials, fibers with an array of FBG sensors allow for distributed measurements of load, strain, temperature and vibration of the material creating what has is commonly referred to as "smart structures" where the health and integrity of the structure is monitored on a real-time basis.

Typically fiber Bragg gratings are generated by exposing the UV-photosensitive core of a germanium doped silica core optical fiber to a spatially modulated UV laser beam in order to create permanent refractive index changes in the fiber core. Such a spatially modulated UV beam can be created by using a two-beam interference technique as disclosed in U.S. Pat. No. 4,807,950 by Glenn et al. or by using a phase mask as disclosed in U.S. Pat. No. 5,367,588 by Hill et al.

A limitation of the prior-art UV-induced fiber Bragg gratings, especially for high temperature sensor applications is that operation of the sensor at elevated temperatures results in the erasure or annealing of the UV-induced color centers which are responsible for the induced index change of the grating. In fact, at temperatures approaching the glass transition temperature of the fiber, which for silica is approximately 1000° C., total erasure of the induced index modulation results. The fiber also is modified at such high temperatures making it brittle with diffusion of the core material into the cladding. The fiber can easily be deformed by its own weight.

Another method for creating permanent photoretractive index changes in glasses employs the use of intense UV beams with fluences or energy/unit-area per laser pulse densities that approach those required to produce macroscopic damage of the glass. Askins et al. in U.S. Pat. No. 5,400,422 teach a method for producing permanent photo-retractive index changes in the photosensitive cores of Ge-doped optical fibers with single high intensity UV laser pulses. The high intensity portions of the interference fringes created by two crossed UV beams split from a single UV beam create localized damage at the core-cladding interface within the fiber. Because the process for inducing index change is one of structural change due to localized physical damage to the glass, rather than due to UV photoinduced color center formation, the induced index change is more robust and does not decrease with elevated temperature. In fact Askins et al. disclose that gratings produced in this way cannot be removed by annealing until the fiber or waveguide approaches the material's glass transition temperature. The drawback of this approach for induction of index change is that the Bragg gratings produced in this fashion have relatively low refractive index modulations ($\Delta n=10^{-4}$) and are mechanically weak since the effective refractive index change results from periodic localized damage at the core-cladding interface. When the pulse duration is long (>a few tens of picoseconds) laser-excited electrons can transfer energy to the surrounding lattice faster than the thermal diffusion of the material can remove the energy resulting in damage. If the laser pulse continues to feed energy into the damage site, the damage can propagate beyond the irradiated zone. For damage grating structures written with long laser pulse durations greater a few tens of picoseconds, the spectral quality of the resulting Bragg grating is often poor.

The prior art FBG sensors suffer from serious limitations when measurement of displacement, temperature, strain and pressure are required at high temperatures. The materials used to fabricate the FBG sensing element deform or melt. The softening or glass transition temperature of silica optical fibers is typically 1000° C. At temperatures equal to or above this, silica optical fibers are not useful, even if they are coated with materials which melt at higher temperatures.

One approach to fiber-based measurements at high temperatures is to use sensor elements fabricated in fibers made of sapphire. Because sapphire has a very high glass transition temperature (~2030° C.), a sensor fabricated in this fiber can be operated in high temperature environments. Currently, sapphire fibers are only made in the form of rods with diameters as low as 50 μm. These rods lack a cladding or a coating material similar to conventional silica fibers. The large diameter of the sapphire fiber does not support single mode propagation at typical wavelengths used for FBG sensors in silica fiber thus does not allow the implementation of the FBG sensor as described previously. A technique for the fabrication of a sapphire based optical fiber interferometer based on the fabrication of a Fabry-Perot etalon on the tip of the sapphire fiber has been taught by Murphy et al. in U.S. Pat. No. 5,381,229. Although this device is effective as a point sensor, is relies on the monitoring of the broadband interference fringe pattern generated by the Fabry-Perot etalon and therefore is extremely difficult to address in a wavelength-division or time-division multiplexing fashion. This makes the Fabry-Perot based fiber sensor inappropriate for distributed sensor arrays.

Mihailov et al. in U.S. Patent Application 20040184731 published Sep. 23, 2004, incorporated herein by reference discloses a technique for fabrication of Bragg grating structures in optical media such as optical fibers and waveguides with an ultrafast (<500 ps) laser source and a phase mask using a direct writing technique. The resultant grating structures have high induced-index modulations ($>1\times10^{-3}$). Since the refractive index change need not be dependent on the dopant in the core or cladding of the optical fiber or waveguide, refractive index changes can be induced in both regions of the waveguide. Processes that employ high-intensity laser pulses in the femtosecond pulse duration regime for creating permanent changes in the refractive indices of glasses have been explored by several groups of researchers. K. M. Davis et al. disclose a technique for inducing index change in bulk glasses with ultra-high peak power femtosecond infra-red radiation in Opt. Lett 21, 1729 (1996). The creation of waveguides in bulk glasses using this technique is taught by Miura et al. in U.S. Pat. No. 5,978,538 while the modification or trimming of existing waveguide structures is taught by Dugan et al. in U.S. Pat. No. 6,628,877. The physical process that causes the refractive index change in the materials is due to the creation of free electrons through non-linear absorption and multi-photon ionization of bound charges, followed by avalanche ionization and localized dielectric breakdown as these free electrons are accelerated by the intense but short time duration laser field. Also, this leads to a localized melting and restructuring of the material and a concurrent increase in the index of refraction. Recently Sudrie et al. in Opt. Comm., vol. 191, no. 3-6, pp. 333-339, 2001 disclosed a technique for inducing index changes in bulk silica using a femtosecond IR laser source with a power threshold below that needed for multi-photon ionization. The resultant index change induced by multiphoton absorption produced microscopic defects or color centers in the lattice. Unlike the index change created through localized dielectric breakdown of the material, the color center induced index change can be removed or annealed out at temperatures below the glass transition temperature of the material.

For a fiber grating sensor application it is desirable to obtain a single mode response in the reflection spectrum because the bandwidth of the response is narrower and there is improved signal to noise ratio as there is only one mode being inspected rather than a superposition of hundreds if not thousands of modes that can be supported in a multi-mode fiber. For step index fibers the normalized frequency or V number is given by:

$$V = \frac{2\pi r}{\lambda}\sqrt{(n_{co}^2 - n_{cl}^2)} \quad (1)$$

where r is the core radius, l is the wavelength and $n_{co}$ and $n_{cl}$ are the refractive indices of the core and cladding respectively. For single mode operation, $V \leq 2.405$. When a fiber is tapered, by using the hydrogen flame brushing technique for example (see Bilodeau et al U.S. Pat. No. 4,895,423 enclosed herein as reference) the ratio of cladding/core radii remains constant however V decreases. As disclosed in J. D. Love et al *IEE Proceedings Journal* vol. 138, no. 5, p.343-354 (1991), herein enclosed as reference, when single mode optical fiber is tapered down such that the normalized frequency or V number of the taper is V<0.84, the fundamental $LP_{01}$ mode is no longer confined to the core but instead is guided by the cladding-air interface resulting in a mode field with the same diameter as the tapered fiber. By launching this expanded fundamental $LP_{01}$ mode that has the same mode field diameter as the cladding of the multi-mode fiber, only the fundamental mode of the multimode fiber will be excited, in the absence of perturbations such as twisting and bending of the multimode fiber. The retro-reflection from the grating would still consist of a small number of modes however the fundamental from the grating would be reciprocally collected by the taper and converted to a core guided $LP_{01}$ as it exited the tapered region of the coupling fiber.

As the technology for fabrication of long lengths of single crystal fiber is in its infancy, it is difficult and costly to have long lengths (>4 m) of sapphire fiber for a multiplexed sensor web. An alternative to single strands of fiber may be to couple short lengths of sapphire fiber, with gratings present, to single mode fiber which has been appropriately tapered to excite the fundamental mode of the sapphire fiber segment. If an identical taper to the input taper is placed at the output of the multimode sapphire fiber, then a single mode transmission response can be obtained. The device is a one way device in that at the Bragg resonance wavelength a single mode response is retro-reflected. Light propagating in the sapphire fiber that is not at Bragg resonance is transmitted through. If another sapphire grating is coupled into the fiber further along the line with another Bragg resonance, then its light is reflected from the second grating but is retro-reflected through the first. Therefore in one length of fiber comprising tapered and sapphire links two different locations can be monitored. In this fashion, sapphire fiber grating elements can be multiplexed together into a sensor web.

In another embodiment of this invention, for lower temperature applications that are near the glass transition temperature of silica, the sapphire multimode fiber rod could be replaced with a pure silica rod. The grating that could be written could be in silica rather than sapphire if the temperatures at which the device would operate would be below the glass transition temperature of silica. In such an instance, gratings written in the silica rod would not be distorted by out diffusion of the core dopant as the fiber approaches the glass transitions temperature. If the fiber is a silica rod without dopant (ie a core) then there is no core distortion as the fiber approaches the glass transition temperature. In another embodiment of this invention, the expanded mode field propagating through the multimode fiber is guided by air-material interface with the cross-section of the fiber acting as the guiding core. The single mode reflection obtained with the taper as described above would be dependent on the effective index seen by this mode. Since the mode as it propagates through the multimode fiber has a mode field the same as the fiber diameter, its effective index is influenced by the refractive index of the medium surrounding the multimode fiber. It is therefore possible to measure the refractive index of the medium in which the multimode fiber is embedded thus fabricating a chemical sensor. This defines a new chemical sensor, for measurement of refractive index external to the sapphire rod.

It is an object of this invention to overcome the aforementioned limitations within the prior art systems for fabrication of high temperature FBG sensors by inducing refractive index modulations in optical fibers with high melting temperatures such as sapphire fiber.

It is a further object of this invention to provide a method for probing a Bragg grating structure inscribed in a multimode fiber that results in a single mode response by using tapered fiber which launches a fundamental $LP_{01}$ with an expanded mode field diameter that is the same as the fiber diameter.

It is a further object of this invention to provide a method for fabrication of a single mode core in the sapphire fiber rod into which a FBG sensor can be inscribed.

It is an object of this invention to overcome the aforementioned limitations within the prior art systems for fabrication of high temperature FBG sensors by inducing refractive index modulations in optical fibers with high melting temperatures such as sapphire fiber.

It is a further object of this invention to provide a method for fabrication of a single mode core in the sapphire fiber rod into which a FBG sensor can be inscribed.

It is a further object of this invention to provide a method for fabrication of a single mode core in the sapphire rod by the inscription of a localized FBG structure along the length of the sapphire rod.

SUMMARY OF THE INVENTION

There are three broad aspects to this invention. An optical waveguide sensor is provided that may conveniently be made of a rod of a crystalline material such as sapphire, having a glass transition temperature substantially above that of silica, and which has written into the core thereof, a retro-reflective grating that is suitable as a sensor in relatively high temperature environments; when the rod consists entirely of a core material having no cladding, which is typically the case with a sapphire optical fiber, the grating can be used as a chemical sensor sensing information about the surrounding environment. The crystalline material having the grating written therein is also useful as a mechanical strain sensor or a temperature sensor. In all of these embodiments, using a material with a high glass transition temperature, for example greater than 1300° C., allows the sensor to be used in relatively high temperature environments without the damage thereto. This obviates problems associated with conventional gratings in silica written with UV light sources. In another embodiment, a tapered fiber is provided for exciting a fundamental mode in the multimode fiber it is coupled to. This advantageously provides a method for exciting the fundamental mode of the multimode fiber with a Bragg grating. The tapered fiber then has a fundamental $LP_{01}$ mode which is guided by the cladding-air interface of the taper and a mode field diameter (MFD) that is the diameter of the taper. This expanded mode is then used to predominantly excite the fundamental mode of the multimode fiber. The resulting retro-reflection from the Bragg grating is coupled back through the tapered fiber to produce a narrow band single mode response from the multimode fiber with Bragg grating.

In accordance with an aspect of the invention, an apparatus for sensing the mechanical disturbance or temperature of a sapphire optical fiber is provided comprising a length of sapphire optical fiber having a Bragg grating therein at a selected location in said fiber for reflecting light with a selected plurality of contiguous wavelengths comprising:

a source of light having emission within said selected plurality of bandwidths, said source being optically coupled to said fiber at an end thereof for transmitting said light into said fiber;

an optical coupler coupled to said fiber between said source and said grating for directing light reflected from said grating to a location external of said fiber a detector means for receiving said reflected light from said grating, said detector means analyzes the change in the spectral response of said reflected light from said grating.

In accordance with another aspect of the invention, there is provided a method for exciting the fundamental mode of the multimode fiber with a Bragg grating therein which consists of tapering a single mode fiber such that the normalized frequency or V number of said single mode fiber is V<0.84. The tapered fiber then has a fundamental $LP_{01}$ mode which is guided by the cladding-air interface of the taper and a mode field diameter (MFD) that is the diameter of the taper. This expanded mode is then used to predominantly excite the fundamental mode of the multimode fiber. The resulting retro reflection from the Bragg grating is coupled back through the tapered fiber to produce a narrow band single mode response from the multimode fiber with Bragg grating.

In accordance with another aspect of the invention, there is provided a method of inducing a localized refractive index change to the center and along the length of a sapphire optical fiber for the generation of a core region within an unmodified cladding region of said sapphire optical fiber, comprising the steps of:

providing electromagnetic radiation to the central region of the sapphire fiber, said electromagnetic radiation having a predetermined wavelength range and having a pulse duration of less than or equal to 500 picoseconds, the interaction of the electromagnetic radiation with said optical fiber being sufficiently intense to cause a change in the index of refraction of the central region of said fiber.

In accordance with an aspect of the invention, an apparatus is provided for sensing the mechanical disturbance or temperature and exterior index of refraction of a sapphire optical fiber comprising a length of sapphire optical fiber having a Bragg retro-reflective grating therein at a selected location in said fiber for reflecting light with a selected plurality of contiguous wavelengths comprising:

a source of light having emission within said selected plurality of bandwidths, said source being optically coupled to said fiber at an end thereof for transmitting said light into said fiber; an optical coupler coupled to said fiber between said source and said grating for directing light reflected from said grating to a location external of said fiber;

a detector means for receiving said reflected light from said grating, said detector means analyzes the change in the spectral response of said reflected light from said grating.

Although this invention is primarily related to inducing a retro-reflective grating in a waveguide having a high glass transition temperature, above that of silica, it can be used to write a grating in silica, wherein the silica waveguide or fiber has no cladding. Such a sensor is particularly useful in chemical sensing applications where operation in a high temperature environment is not a requirement.

In accordance with this invention a method for inducing a spatially modulated refractive index pattern to produce a retro-reflective grating filter in an at least partially light transmissive or absorbing material is provided, consisting of one of sapphire, zirconia and diamond comprising the steps of:

provu ing the at least partially light transmissive or absorbing material;

disposing a mask to be used as an interferometer, adjacent the partially light transmissive material such that light incident upon the mask is transmitted directly into said material; and, providing electromagnetic radiation on a surface of the mask, the electromagnetic radiation having a predetermined wavelength range and having a pulse duration of less than or equal to 500 picoseconds, wherein the mask is disposed to permit a portion of the electromagnetic radiation to interact with the mask and be incident on the at least partially light transmissive or absorbing material, the interaction of the electromagnetic radiation with the mask for producing a spatial intensity modulation pattern within the least partially light transmissive or absorbing material, the electromagnetic radiation incident on the least partially light transmissive or absorbing material being sufficiently intense to cause a change in an index of refraction of the at least partially light transmissive or absorbing material, wherein electromagnetic radiation interacting with the surface of the mask having a sufficiently low intensity to not significantly alter produced spatial intensity modulation properties of the mask.

Alternatively, a grating can be induced by point to point writing in the absence of a phase mask.

In accordance with another aspect of the invention, there is provided method for inducing a spatially modulated refractive index pattern in at least a partially transmissive material, comprising the steps of:

providing the at least partially transmissive material;

disposing and orienting a mask adjacent to the at least partially transmissive material at a distance "d" such that group velocity walk-off results in pure 2-beam interference within the at least partially transmissive material when irradiated with a pulse of light of less than or equal to 100 picoseconds, wherein the distance "d" is chosen such that the difference in times of arrival of the order pairs due to group velocity walk-off results in the pure 2-beam interference pattern of sub-beams of said pulse of light that have passed through or reflected off of the mask; and, irradiating the mask with pulsed light having a duration of 100 ps or less to generate the index modulated pattern in the at least partially light transmissive material, wherein the at least partially light transmissive material is one of sapphire, diamond and zirconia.

In accordance with a broad aspect of the invention a sapphire crystal fiber is provided comprising a Bragg grating written into the core region thereof for use in a sensing system. Preferably the Bragg grating is written into the core region thereof by using short femtosecond pulses.

Since sapphire optical fiber in accordance with an embodiment of this invention has no cladding; that is, is essentially a core structure clad only by surrounding air, the term writing into the core region means writing into the core material of the waveguide, or preferably across its entire cross section.

In accordance with the invention, a sensing system is provided having a sapphire crystal fiber having a Bragg grating written into the core by using short femtosecond pulses.

This technique for writing retro-reflective gratings in the core of a sapphire fiber can be used to write retro-reflective structures into zirconia fiber diamond, and other materials having a high glass transition temperature.

BRIEF DESCRIPTION OF THE DRAWINGS

The invention is now described with reference to the drawing in which:

FIG. 11a is an optical microscope image of the index modulation induced in the core and cladding of a standard single mode telecom fiber (SMF-28) using the femtosecond laser and the phase mask. The view is normal to the fs beam plane.

FIG. 11b is an optical microscope image of the index modulation induced in the core and cladding of a standard single mode telecom fiber (SMF-28) using the femtosecond laser and the phase mask that has been rotated 90° with respect to the image in FIG. 11a.

DETAILED DESCRIPTION OF THE INVENTION

Figure 1:
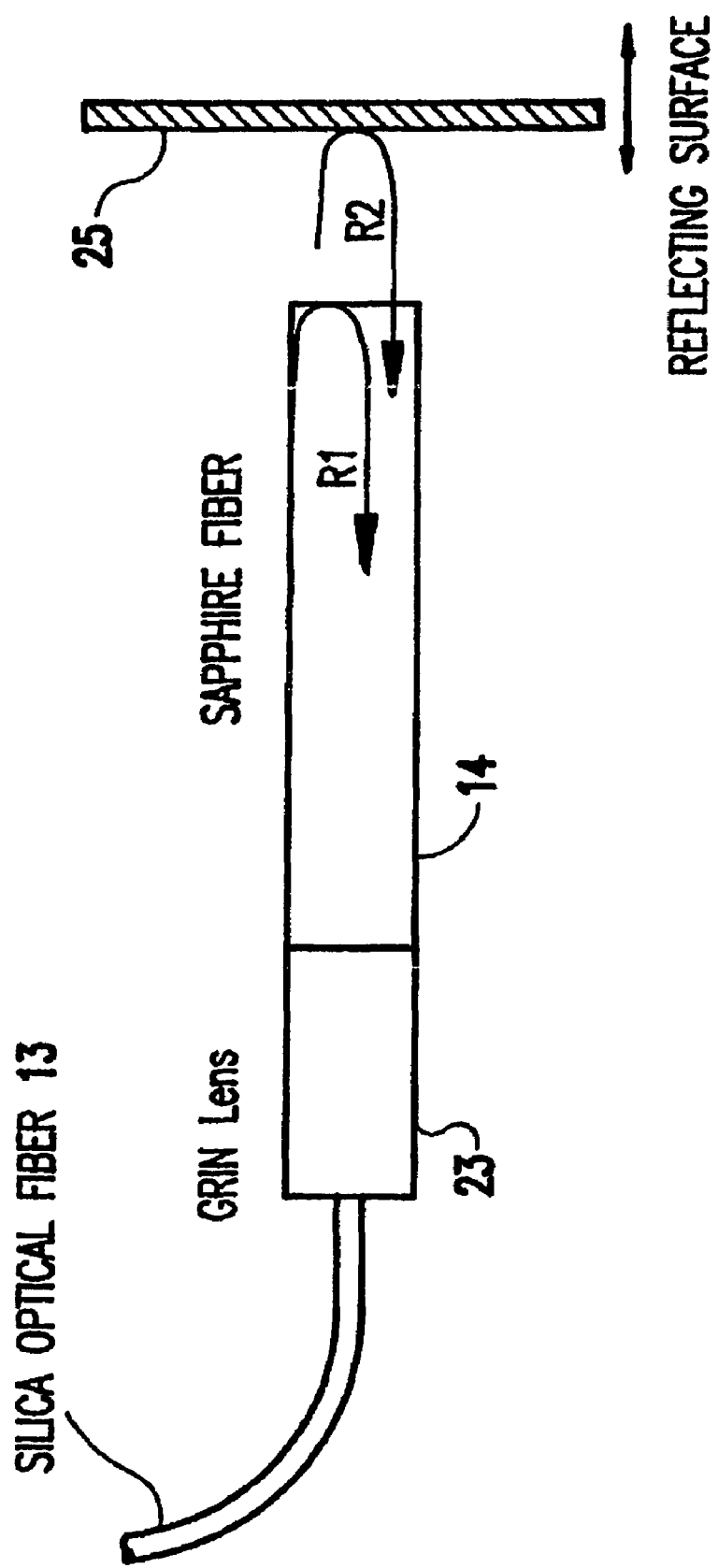
FIG. 1 is a prior art sapphire optical fiber interferometer for high temperature measurements.
Figure 2:
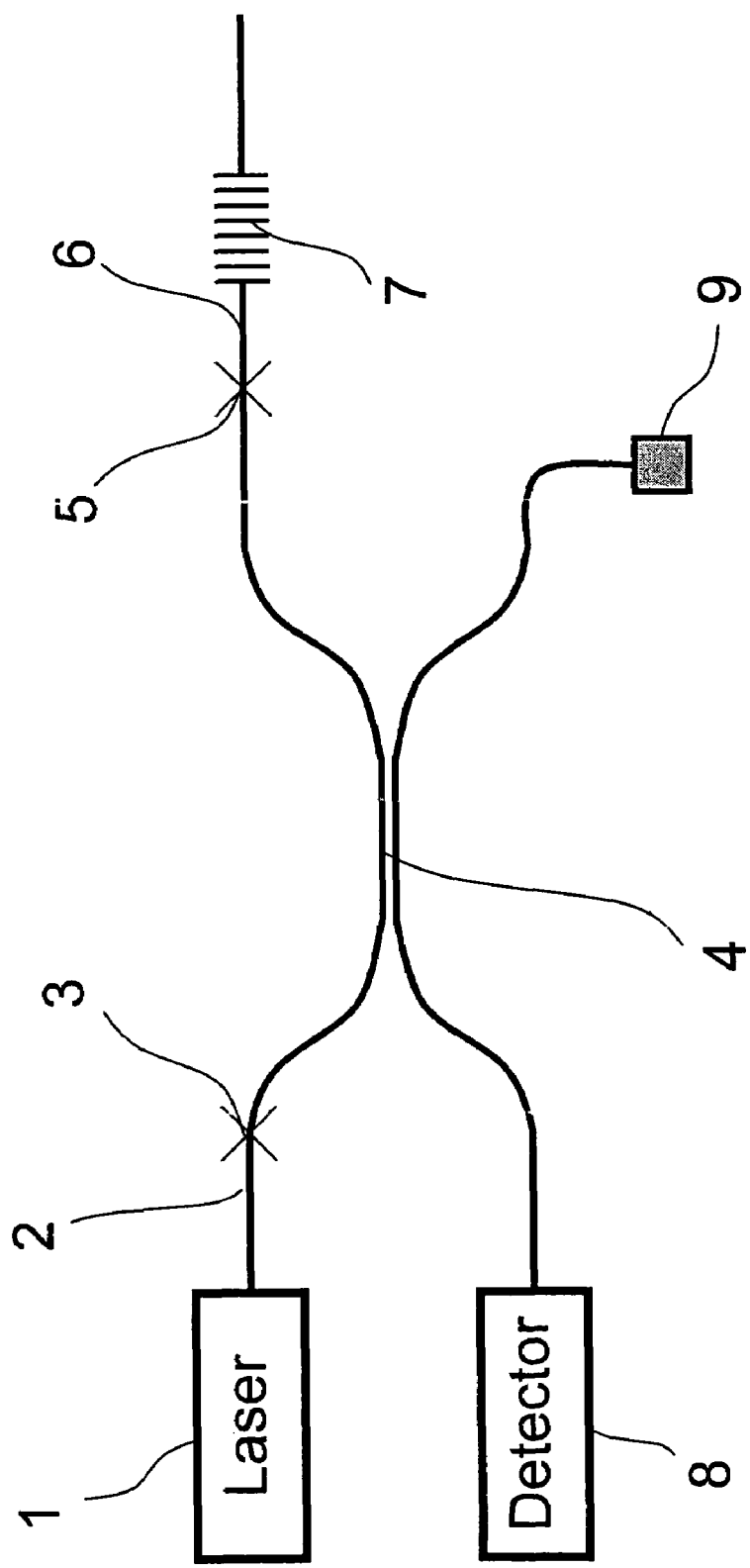
FIG. 2 is a schematic diagram of the monitoring set up of the multimode sapphire fiber Bragg grating sensor according to a preferred embodiment of the invention.

Referring to FIG. 2, light generated by a laser diode or tunable laser 1 is coupled into single mode fiber 2. Light coupled into fiber 2 couples into the input arm of the 50-50 multimode coupler 4 through the single to multimode fiber splice 3. The coupler 4 splits the signal in two with each signal at 50% of the energy. One portion of the beam propagates along the fiber which is terminated with index matching gel 9 and is lost. The other portion propagates to the multimode fibre-sapphire fibre splice 5 and then into the sapphire fibre 6. The light then interacts with the Bragg grating 7 and a portion of the light is resonantly coupled into back reflecting modes by the grating 7. The back reflected modes couple return along the incident path of 6, 5, and 4 to be split again with each reflected signal 50% of the original reflected signal, one portion returning to the laser source 1, the other to the detector 8. In the preferred embodiment the detector is an optical spectrum analyzer.

Figure 3:
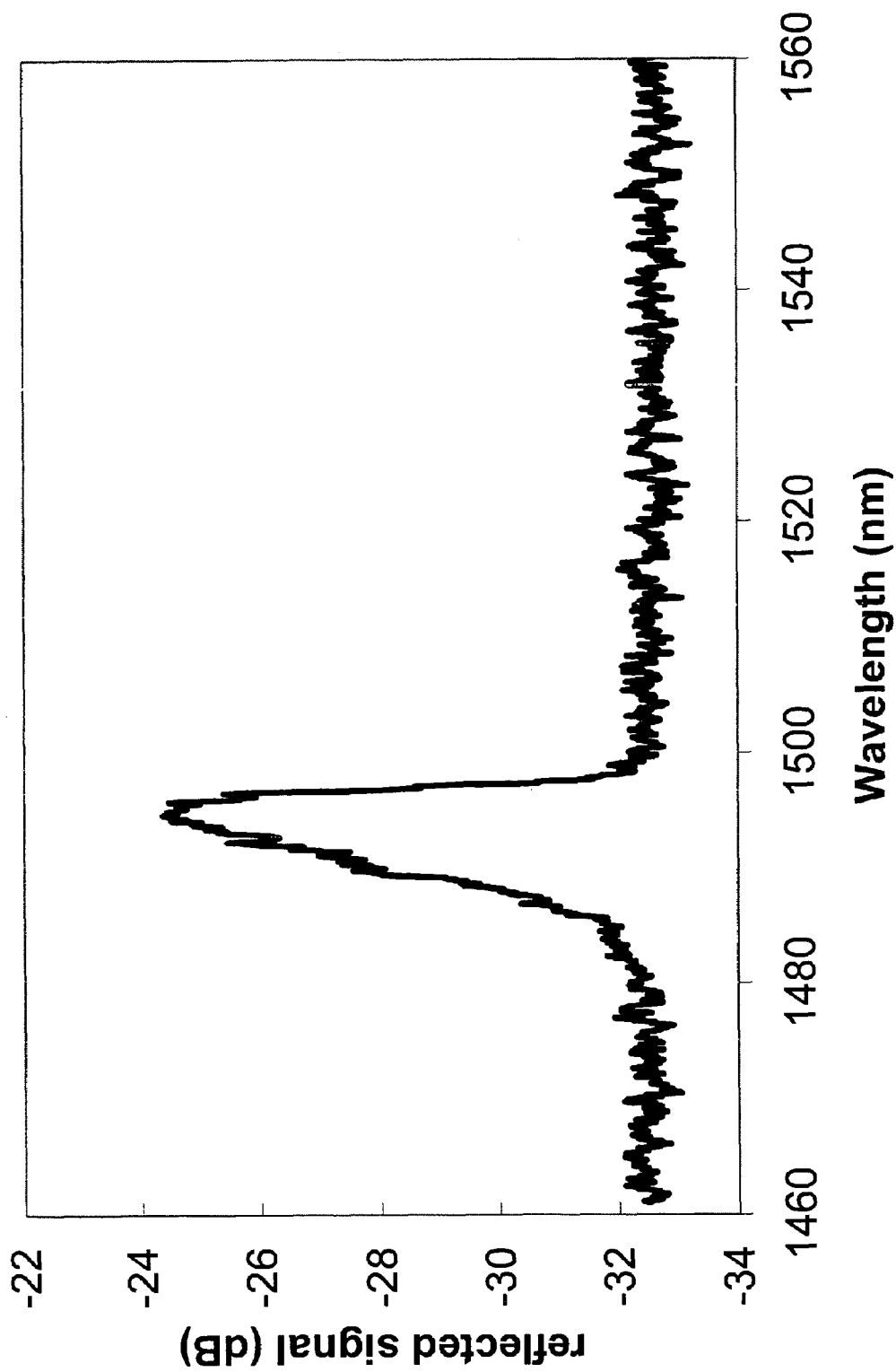
FIG. 3 is a multimode reflection spectrum of the Bragg grating device inscribed in the sapphire fibre.

FIG. 3 presents the multimode reflection spectrum from the Bragg grating in the sapphire fibre. The grating was written with a high powered femtosecond IR laser using a 4.284 µm pitched phase mask as taught by Mihailov et al in U.S. Pat. Application 20040184734, published Sep. 23, 2004, incorporated herein by reference. A fifth order retroreflective grating with a pitch half that of the mask was created in the fiber. With an effective index $n_{eff}$ of 1.746, a series of core mode resonances are superimposed in the grating response. The sharp transition on the long wavelength side of the response can be attributed to the fundamental $LP_{01}$. This is a result of the fundamental mode being initially excited. The long wavelength transition is the lowest order mode generated. Higher order reflected guided modes are resonant at lower wavelengths and may partially overlap the $LP_{01}$ mode, depending on the length of the grating.

Figure 4:
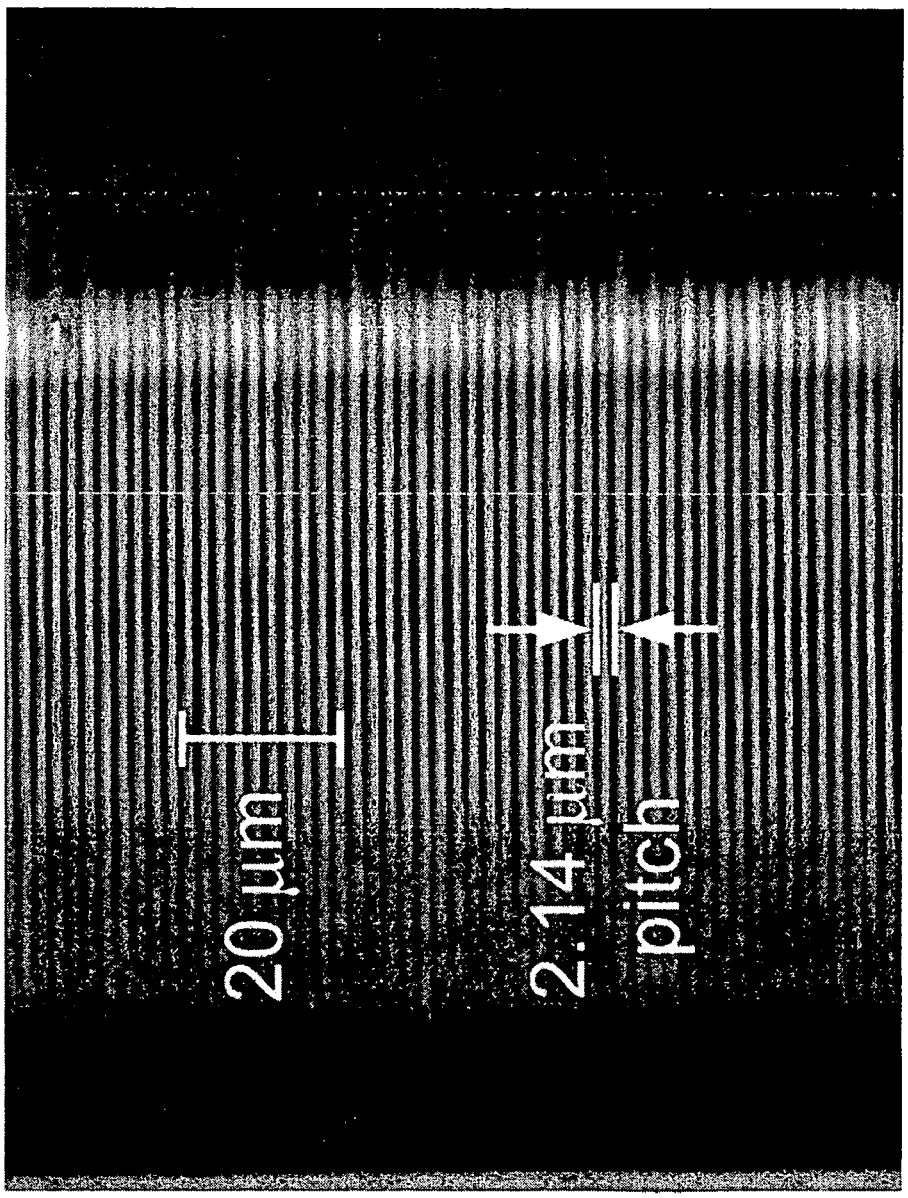
FIG. 4 is an optical microscope image of the index modulation induced in the sapphire rod using femtosecond IR laser radiation and a zero-order nulled phase mask.

FIG. 4 presents an optical microscope image of the Bragg grating structure induced in the sapphire fibre. The pitch of the grating structure is half that of phase mask.

Figure 5:
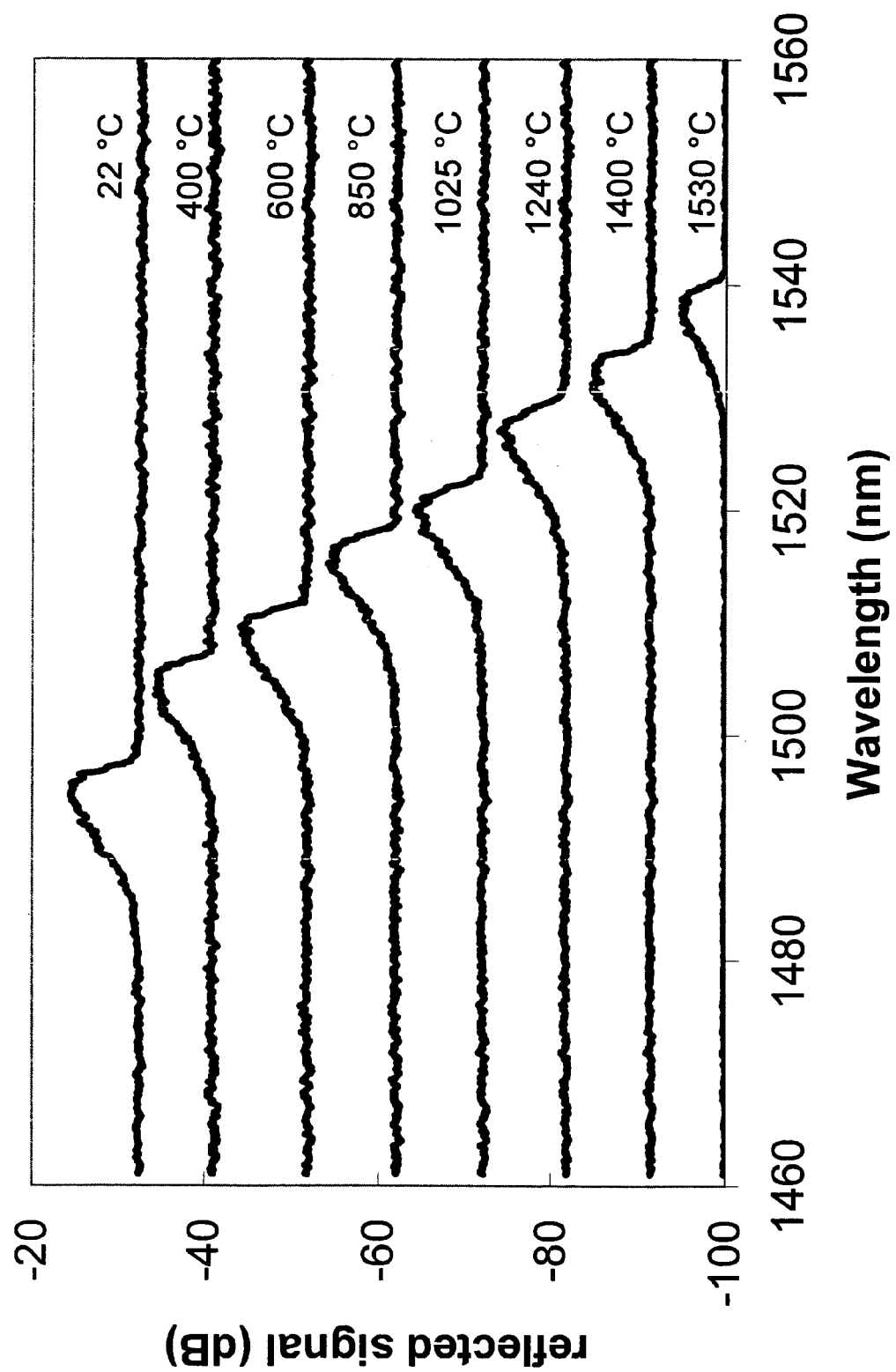
FIG. 5 denotes the shift in wavelength of the spectral response of the grating with increasing temperature.

Referring to FIG. 5, the resonant wavelength of the grating shifts with increasing temperature. The reflectivity spectra are each offset by 10 dB for clarity. The signal to noise ratio remains relatively constant except at high temperatures (1530° C.) where broadband infrared radiation emitted by the ceramic elements of the furnace are coupled into the fibre through the fibre grating.

Figure 6:
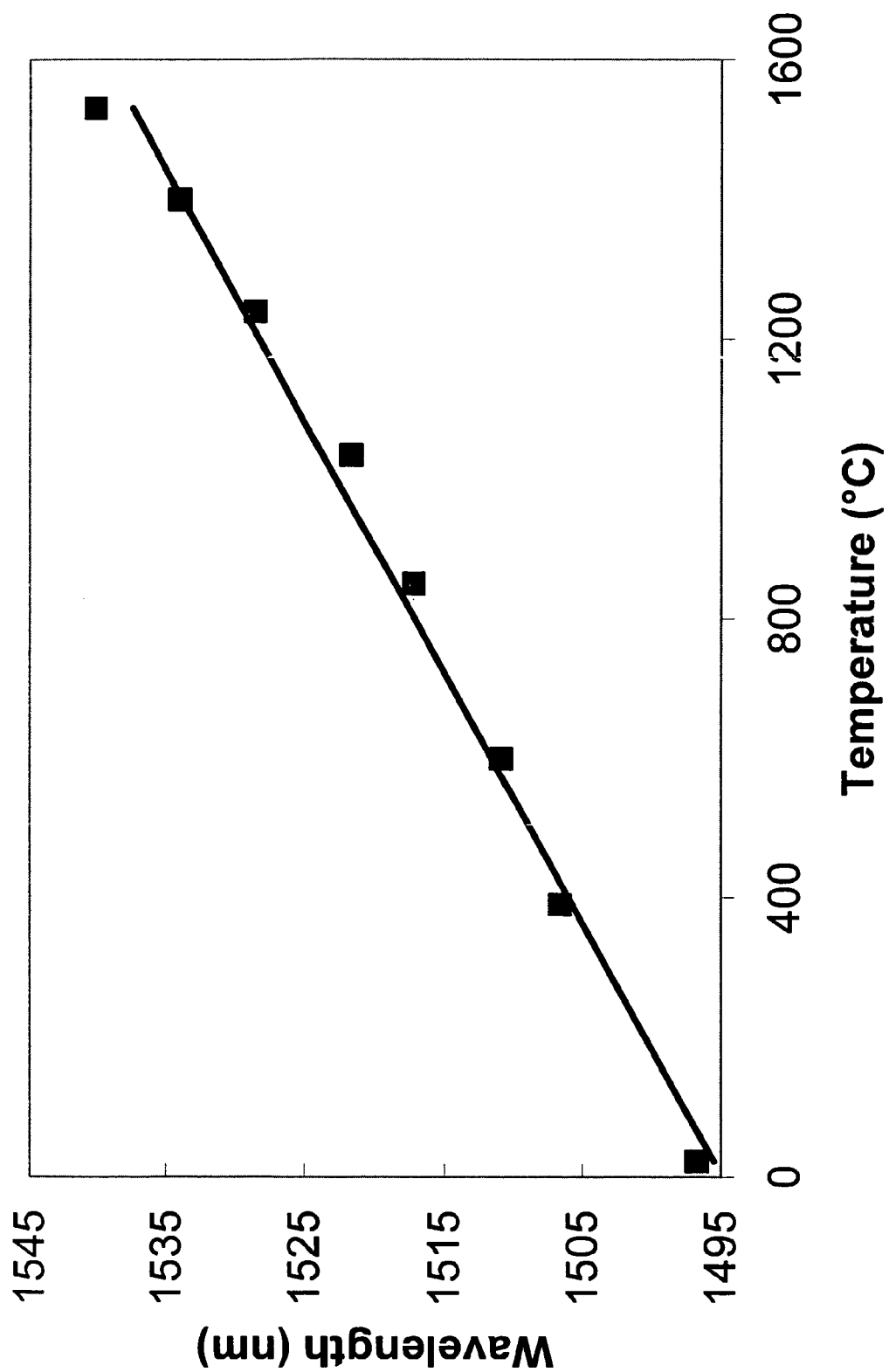
FIG. 6 presents the change in wavelength of the long wavelength edge of the reflection response as a function of temperature measured with a thermo-couple.

By monitoring the wavelength of the sharp transition on the long wavelength side of the response from the peak reflection at the −3 dB signal level, and correlating this wavelength with a temperature measured with a Platinum/Rhodium thermocouple, the variation in wavelength as a function of temperature is plotted in FIG. 6. Performing a linear regression, the wavelength varies at 28 pm/° C.

Figure 7:
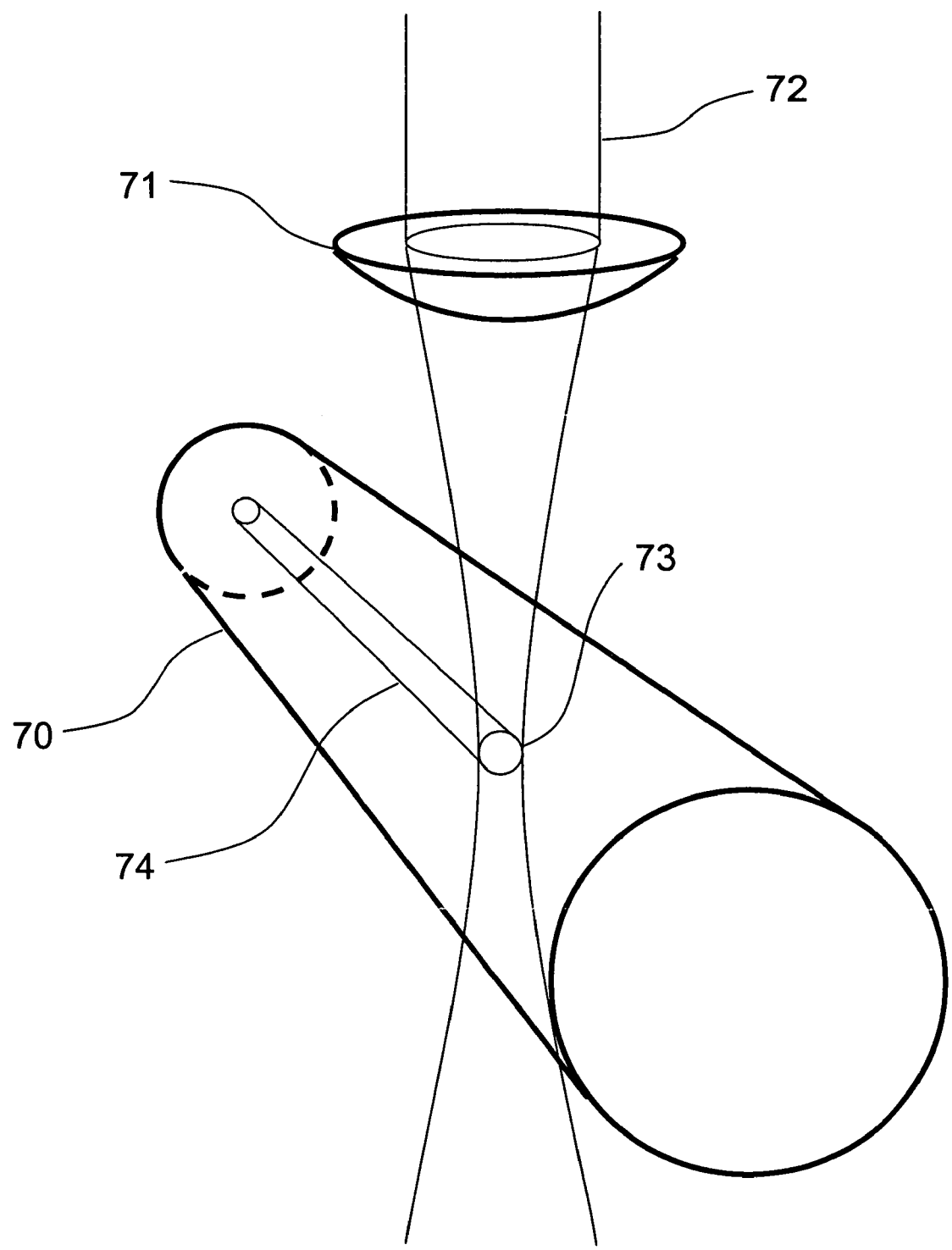
FIG. 7 presents a schematic representation of a technique to induce a core structure within a sapphire fiber rod.

Referring to FIG. 7, in another embodiment of the invention, an ultrafast laser beam 72 could be tightly focused to a spot size 73 by a focusing element 71. The focal spot could then be translated along the length of the sapphire fiber 70 to induce an index change along the center of the sapphire fiber. This induced index region would act as a fiber core 74. The core structure could be optimized to propagate light in the single mode regime. With a core suitably inscribed, a grating structure can be inscribed in the core region as taught by Mihailov et al in U.S. patent application 200401834731 published Sep. 23, 2004 and in U.S. Pat. Application 20040184734 published Sep. 24, 2004. The resulting FBG sensor operating in single mode would then have a finer spectral resolution.

Figure 8:
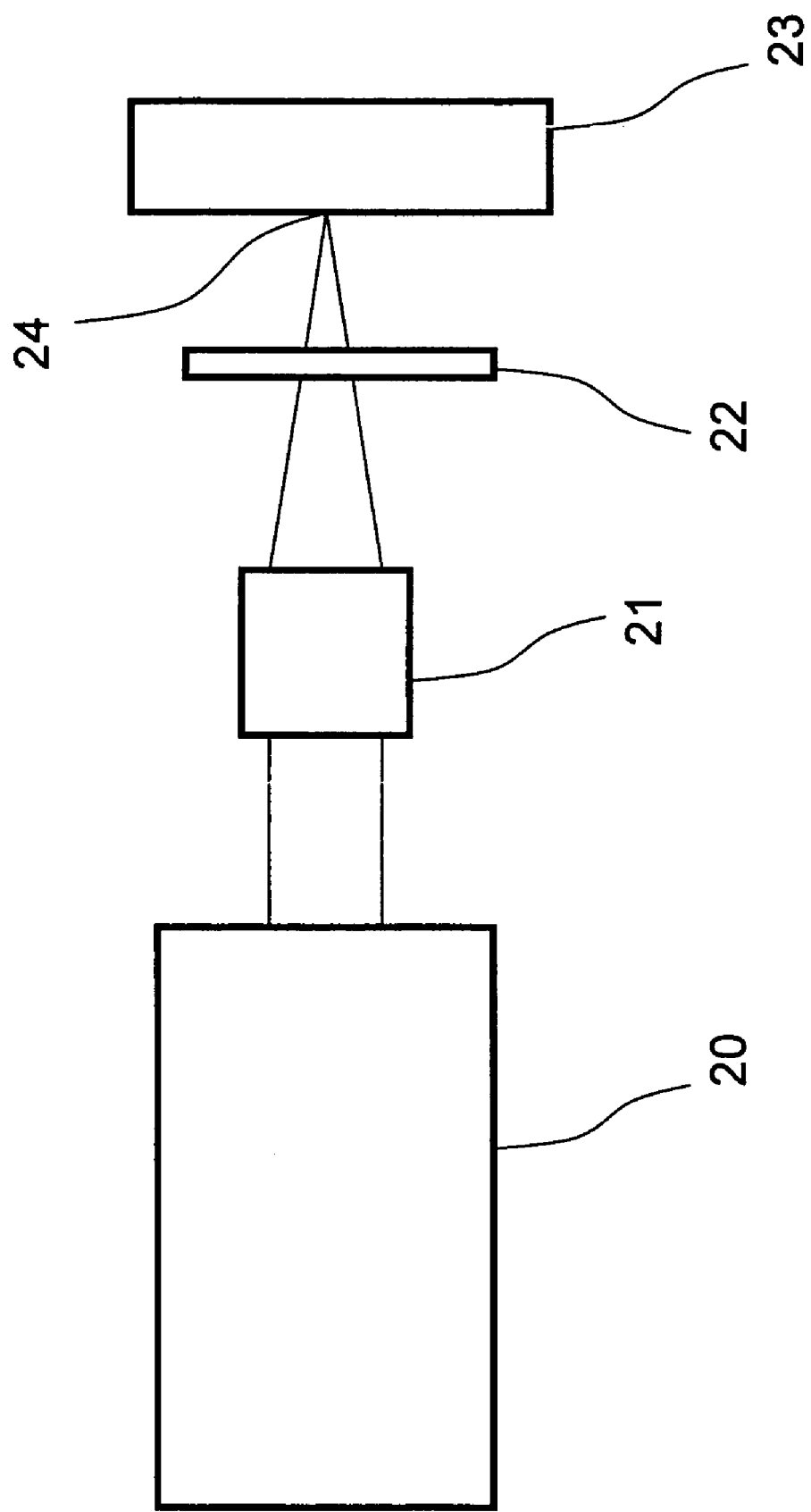
FIG. 8 is a diagram of a system according to an embodiment of the invention.

Referring to FIG. 8, a simplified diagram of an apparatus for producing fiber Bragg gratings (FBGs) according to an embodiment of the invention is shown. The apparatus comprises: a laser source 20 for providing ultra-short duration pulses of laser light; a cylindrical lens 21 for focusing the ultra-short duration pulses at a target 24; a diffractive optical element 22; and, an optical waveguide 23 having a target portion 24. In use, the optical waveguide 23 is biased against a fixture. The diffractive optical element 22 is positioned adjacent to and aligned with the target portion 24. In the instance where a grating is to be written into a sapphire fiber, in accordance with this invention, there is no need to strip off any external jacket. When the laser source 20 is activated it emits an ultra-short duration pulse of laser light. The ultra-short duration pulse propagates from the laser source 20 and is directed to pass through the cylindrical lens 21. The ultra-short duration pulse then propagates from the cylindrical lens 21 to the diffractive element 22. The diffracted ultra-short duration pulse of laser light then propagates into the optical fiber wherein an interference fringe pattern is generated. The intensity peaks of the interference fringe pattern are spatially oriented along a length of the optical fiber to cause periodic index changes within the fiber at predetermined intervals, thus forming a Bragg grating therein. Although this embodiment of the invention relies upon a cylindrical lens 21 for focusing the ultra-short duration pulses of light this need not be the case. In an alternative embodiment of the invention, means for providing optical power in the form of a focusing mirror is used to focus the ultra-short duration pulses of light instead of the cylindrical lens 21. Although this invention is particularly suited to writing gratings, such as retroflective Bragg gratings in the core or cladding of standard telecom optical fiber without the requirement of photosensitizing the waveguide or fiber, it is also well suited to photoresist patterning in optical material and to direct patterning of glasses, semiconductor materials, non-linear crystalline materials such as $LiNbO_3$. Such surface and volume holograms are optionally used for optical encoding and data storage. Similarly taps can be generated by writing Bragg gratings at an angle in the form of a blazed grating as described by Hill et al in U.S. Pat. No. 6,385,369. The invention as described in reference to FIG. 8 improves on remote imprinting of interference fringes generated by a phase mask by using peak powers that are below the damage threshold of the phase mask. Embodiments of the invention featuring a silica phase mask permit the placement of the silica phase mask in close proximity to the target waveguide without damaging the silica phase mask, when laser intensities below the damage threshold of the silica are used. Thus, in an embodiment of the invention, the diffractive element is a silica phase mask. Indeed, the phase mask is optionally made of any material that is transmissive to the range of wavelengths of the ultra short duration pulse of laser light. Suitable materials include BK7 glass, soda lime glass, plastic, and UV transmissive glasses such as silica, calcium fluoride, and magnesium fluoride. Alternative embodiments of the invention feature a phase mask that is not transmissive to the incident ultra short duration pulse of laser light. For example, the phase mask is optionally a frequency-doubling medium like a crystal with an antireflection coating in the infra red so that visible light from an ultra short duration pulse is generated in the phase mask and the generated light diffracted but the IR light is reflected.

In the embodiment of the invention shown in FIG. 8, the alignment of the various components is very important to ensure that a good quality Bragg grating is produced, however the process of aligning the components is relatively simple in comparison with the prior art of Miller et al in U.S. Pat. No. 6,297,894 incorporated herein by reference. Specifically, the fiber is positioned near a predetermined position relative to a focusing point of the laser source 20 and cylindrical lens 21 combination. The diffractive element is positioned within the optical path of a laser pulse and at a predetermined distance from the optical fiber. The impact of the adversity of the angular dispersion of the diffracted beams as taught by Miller et al. is greatly reduced by disposing the silica glass phase grating mask adjacent and parallel to an optical medium. Since the beam intensity is also below the damage threshold of the phase mask, the mask need not be placed and aligned remotely as taught by Miller.

Although this invention relates broadly to creating refractive index changes in optical media such as sapphire fibers by using a diffractive element such as a phase mask, by direct writing techniques, Miller's indirect remote techniques using femtosecond short pulses may also be useful in writing retro-reflective gratings in sapphire fiber.

Preferably, the refractive index change across the cross section of the fiber should be as uniform as possible, and that the index modulation is continuous. As taught by Dyer et al. in "Analysis of grating formation with excimer-laser irradiated phase masks", Optics Communications, Vol. 115, pg. 327-334 (1995), when multiple beam interference occurs the resulting field pattern generated by the phase mask becomes complex. Mills et al. disclose in "Imaging of free-space interference pattern used to manufacture fiber Bragg gratings", Applied Optics, Vol. 39, pg. 6128-6135 (2000) measurements of the field generated by a phase mask. For a phase mask with a poor zero order, multiple beam interference of the 0 and ±1 orders generated by the phase mask produce sinusoidal fringe patterns at a distance from the phase mask known as the Talbot pitch. At the distance corresponding to half the Talbot pitch another set of sinusoidal fringe patterns is generated that are 180 degrees out of phase with the pattern at the Talbot pitch. In order to produce a continuous index modulation across the core and cladding region this phase shift in the generated grating planes is undesirable and should be avoided.

Figure 9A:
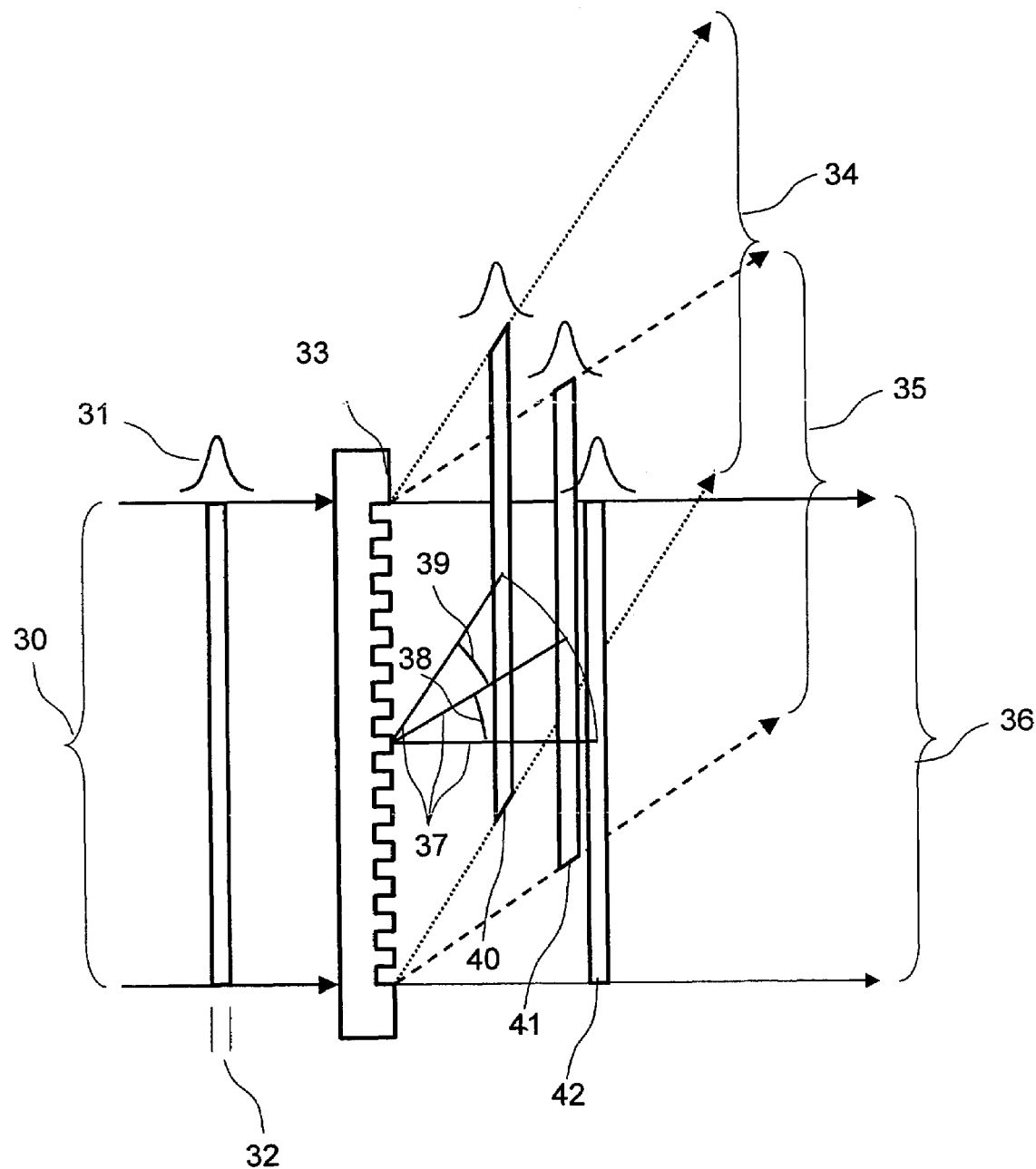
FIG. 9a is a representative view of the time of arrival at a given distance from the phase mask of the fs duration pulse envelopes in each of the 0, +1 and +2 orders.

In accordance with this invention, a more practical approach to writing a grating into the core of a sapphire fiber is to utilize the self-aligning nature of the phase mask to match the path lengths. It should be understood, when referring to writing the core, the entire cross section of the sapphire fiber is the core region, as the fiber has no cladding per se. The surrounding air however acts as the cladding. Referring now to FIG. 9a, the femtosecond beam 30 is normally incident on the phase mask 33. The pulse envelope 31 of the beam is quasi-Gaussian. The 1/e spatial width 32 of the pulse envelope for example for a 120 fs pulse would be 36 µm. When the pulse 31 propagates through the phase mask, the pulse is split and diffracted into various orders (0, ±1, ±2 etc.). For clarity only the 0 order (36), +1 order (35), and +2 order (34) paths are shown. For a given time, the zero order pulse 42 will propagate a distance D (37) from the phase mask. The +1 order pulse 41 will propagate a distance D (37) along the first order beam path 35 which is at an angle 38 with respect to zero order beam path 36. Similarly the +2 order pulse 40 will propagate a distance D (37) along the first order beam path 34 which is at an angle 39 with respect to zero order beam path 36. The angles 38 and 39 are calculated using $\sin\theta_i = i\lambda/\Lambda$ where $\theta_i$ is the angle due to the $i^{th}$ order, $\lambda$ is the wavelength of the femtosecond beam and $\Lambda$ is the mask pitch. For a given propagation distance 37 of the zero order, the corresponding projections d of the pulses 41 and 42 on to the zero order beam 36 will be less than D (37) where $d=D\cos\theta_i$. When D−d is larger than the pulse width 32, the orders have "walked-off" each other and will no longer interfere.

Figure 9B:
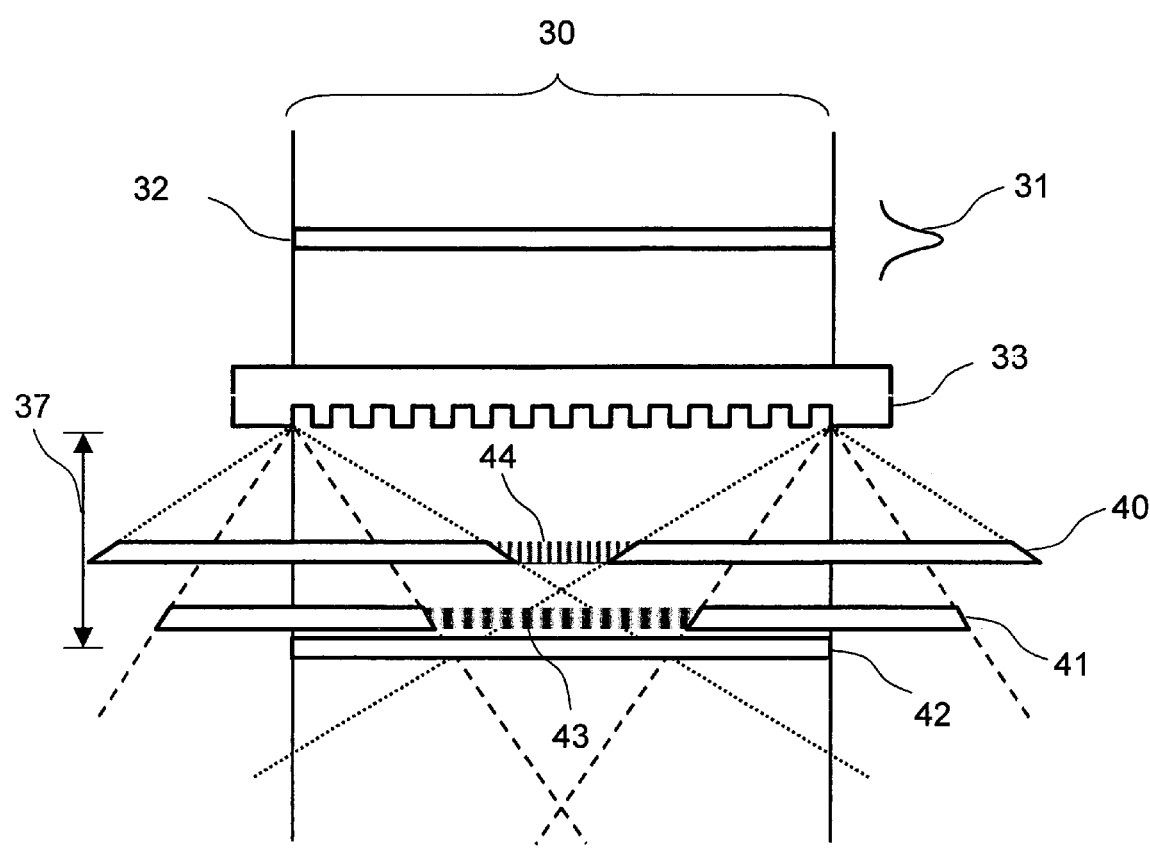
FIG. 9b is a representative view of interference fringes generated by overlapping fs pulse envelopes a given distance from the phase mask.

Referring to FIG. 9b, since the time of arrival of the pulses 40, 41, and 42 will be different at distance D (37) from the phase mask, this difference causes a spatial separation of the order pairs due to group velocity walk-off resulting in a pure 2-beam interference pattern rather than multiple beam interference patterns observed near the phase mask. For the time it takes the zero order pulse 42 to propagate the distance 37, the ±1 order pulses 41 will propagate and interfere in region 43. The pitch of the interference pattern is half the pitch of the phase mask. The region where the ±1 orders does not overlap, that is where there is transverse walk-off of the beams, there are no interference pattern generated. Since the femtosecond source has very good spatial coherence, any overlap of the ±1 orders will result in a high visibility 2-beam interference pattern with a period that is half that of the mask. A similar effect will occur for the ±2 orders 40 producing an interference fringe pattern 44 which has a pitch that is ¼ that of the phase mask. Since the index change due to femtosecond irradiation is a highly nonlinear multiphoton absorption/ionization process, only the order pairs that create an interference fringe patterns with sufficient intensities will result in an induced index modulation. If the phase mask has been designed to be zero-order nulled as taught by Hill et al. in U.S. Pat. No. 5,367,588, the majority of the energy is coupled into the ±1 orders (~70%).

Figure 10:
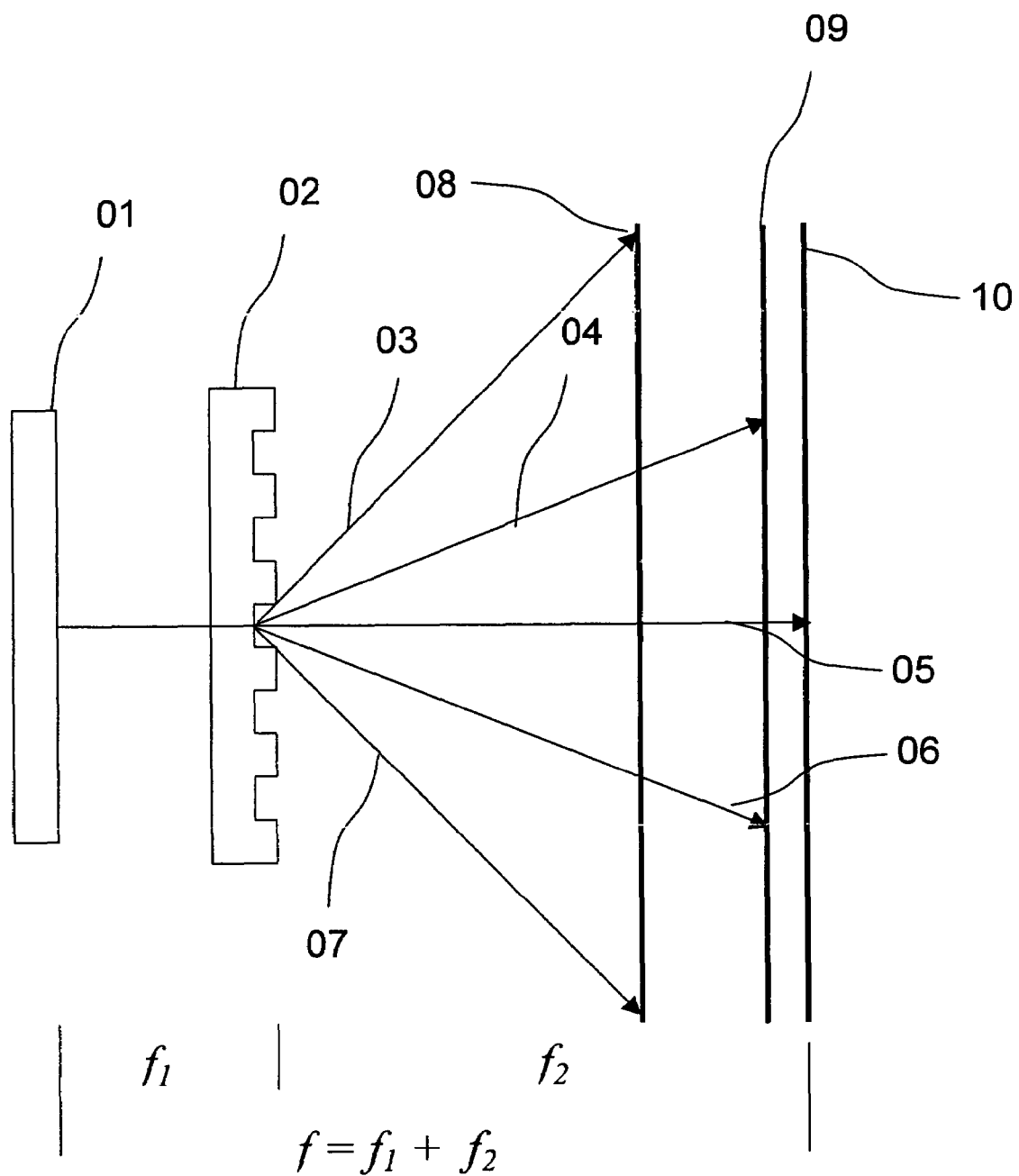
FIG. 10 is a representative view of the variation in focal plane position as a function of diffracted orders for a mask with 5 generated orders.

As well as the order walk-off of each of the phase mask order pairs, each order pair, 0, ±1, ±2 etc, also have different focal positions normal to the phase mask Referring to FIG. 10, the focal length of the cylindrical lens 01 is $f$. When the phase mask 02 is placed a distance $f_1$ away from the lens 01, each of the diffracted beams 03, 04, 05, 06, and 07 representing the +2, +1, 0, −1 and −2 orders respectively each focus their respective diffracted beams a distance $f_2$ along the diffracted order beam path such that $f=f_1+f_2$. The order pairs ±2, ±1, 0 then have focal planes 08, 09, and 10 respectively with respect to the normal distance from the phase mask 02. If a phase mask is so designed to have significant coupling of the incident laser energy into a specific order pair, the combination of the diffracted order walk-off effect and variation in order focusing can be exploited such that the specific order pair is that which generates the interference pattern that induces the index change in the waveguide. For example, a 2.142 µm period silica mask when etched to a depth of 925 nm for optimal zero order suppression for an incident wavelength $\lambda=800$ nm, produces 5 diffracted orders +2, +1, 0, −1 and −2 as shown figuratively in FIG. 10. For this etching depth, the majority of the energy is coupled into the ±1 orders (~70%). From rigorous coupled-wave analysis theory as taught by M. G. Moharam et al. J. Opt. Soc. Am., Vol. 71, pp.811-818, 1981, an etch depth of 1800 nm would result in coupling of 40% of the laser energy incident on the mask into the ±2 orders. By using a short focal length cylindrical lens with a 19 mm focal length which would have a focal line width of ~4 μm for a 4.9 mm diameter incident beam, the corresponding free space Rayleigh range for the focused beam is $z_R=\pi w^2/\lambda$. The beam will remain approximately collimated over twice this length. For the example of the 19 mm focal length cylindrical lens the Rayleigh range is ~15 μm, which corresponds to a confocal parameter ~30 μm in length. By placing the phase mask close to the focusing lens to minimize $f_1$ and in combination with the order-walk off effect, the ±2 orders could be focused in the waveguide while the ±1 and 0 orders are still highly defocused. As the process for the induced index change in the waveguide is highly nonlinear it would only be the focused and interfering ±2 orders that would generate the index modulation in the waveguide. The resulting interference pattern would be ¼ of the mask pitch. This technique is advantageous for producing structures that are significantly smaller than original phase mask structure thereby relieving manufacturing tolerances on the phase mask.

Figure 10A:
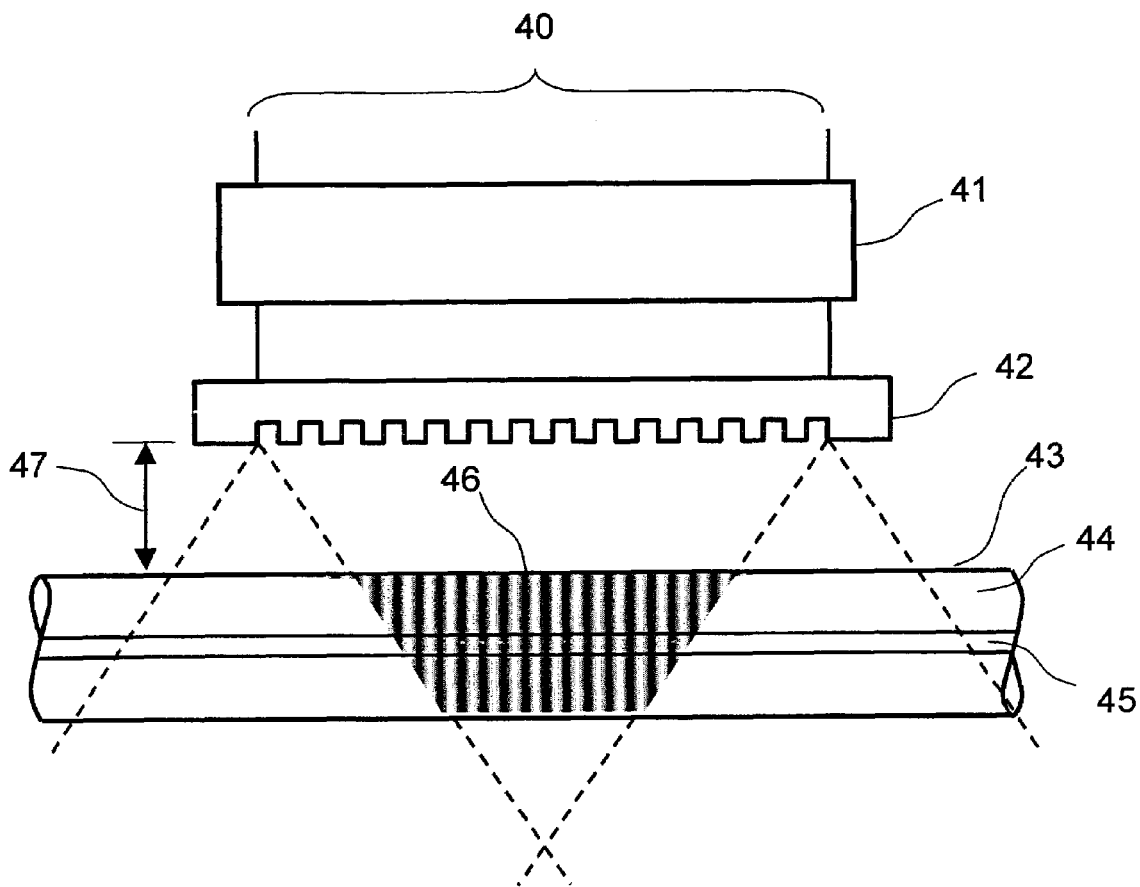
FIG. 10a is a representative top view of an optical fiber being written to using the apparatus of FIG. 8.

Referring to FIG. 10a a top view diagram representative of a fiber receiving a pulse as described with reference to FIG. 8. By way of example, FIG. 10a includes an optical fiber 43, having a waveguide cladding 44 and a waveguide core 45, which is placed a distance 47 from the phase mask such that the difference in times of arrival of the order pairs due to group velocity walk-off results in a pure 2-beam interference pattern; a diffractive element 42 in the form of a phase mask; and a lens 41. As the ±1 orders propagate through the cross-section of the fiber 43, they will generate the index modulated pattern 46 in both the cladding 44 and core 45 of the optical fiber. In FIG. 5 experimental results are shown, obtained with a 3.213 □m mask. Although this description addresses conventional optical fiber having a core and a cladding, it should be understood that air clad sapphire optical fibers essentially made of a fiber only having a core can be utilized in a same manner to write a grating therein and is particularly advantageous for sensing the environment surrounding the fiber. The core 45 is shown to be a monolithic core having no seams or joints. The index modulated pattern 46 is a grating formed within the monolithic core.

Figure 10B:
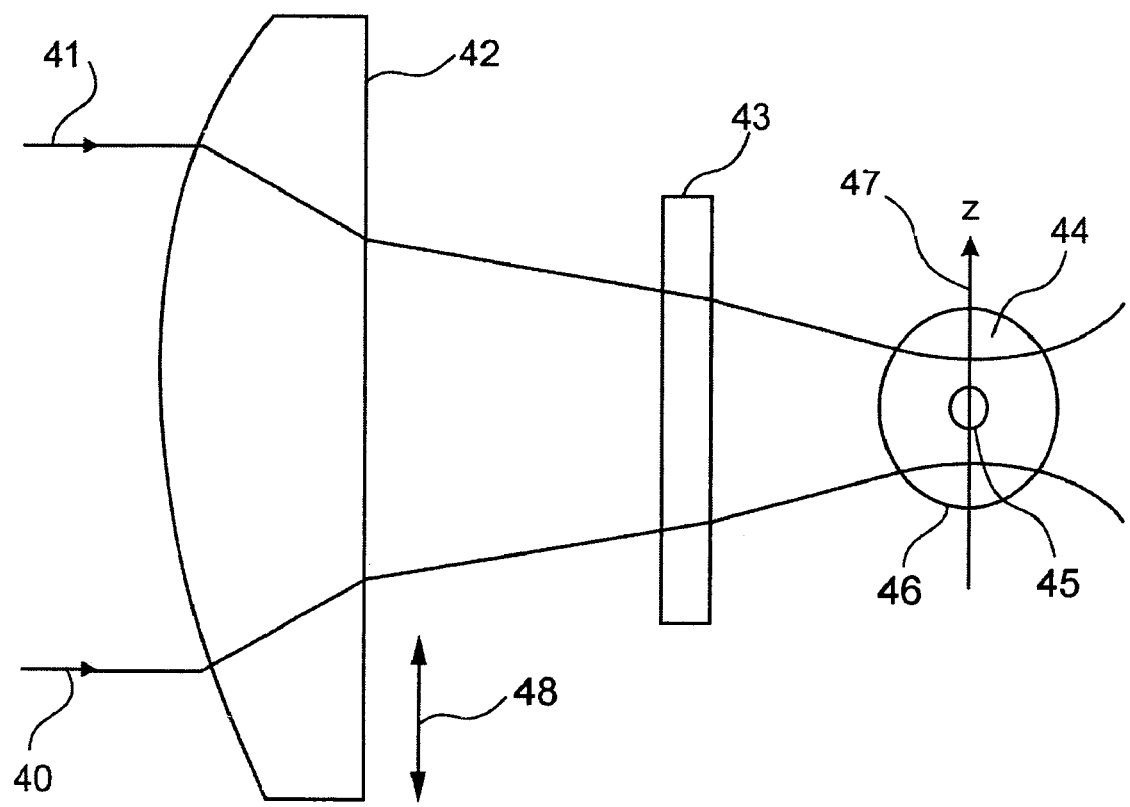
FIG. 10b is a representative side view of an optical fiber being written to using the apparatus of FIG. 8, however, this figure does not take into account the different focusing planes as denoted in FIG. 10

Referring to FIG. 10b, a side view of the components presented in FIG. 10a is shown. This diagram includes indications of rays 40 and 41 that are indicative of the extent of an optical pulse. The rays 40 and 41 are shown converging as they approach the diffractive element 43. The separation of the rays 40 and 41 within the diffractive element 43 is shown to be larger than their separation within the waveguide next to the waveguide core 45. Thus, it is apparent that the maximum intensity of the light pulse is proximate or near the waveguide core 45. It should be noted that the rays are nearly symmetric about the axis 47. Tight focusing of the optical pulse will also permit smaller focal spot sizes, less than the waveguide core, which will allow for fabrication for selective exposure of specific regions of the core and cladding. In the preferred embodiment of the invention, the cylindrical lens 42 has a short focal length so that the beam focus is much smaller than the waveguide cladding 44. Considering Gaussian beam optics, the half width of the focal line would be $w \approx \lambda f/\pi w_o$ where $\lambda$ is the wavelength and $f$ is the focal length of the cylindrical lens. For example a cylindrical lens with a 19 mm focal length would have a focal line width of ~4 μm for a 4.9 mm diameter incident beam. The corresponding free space Rayleigh range for the focused beam is $z_R=\pi w^2/\lambda$. The beam will remain approximately collimated over twice this length. For the example of the 19 mm focal length cylindrical lens the Rayleigh range is ~15 μm which corresponds to a confocal parameter ~30 μm in length which is greater than the waveguide core 45 but less than the waveguide cladding 44. By scanning the lens 42 vertically (48), the focal spot generated by the rays 40 and 41 can be swept along the axis 47. In this fashion the induced refractive index modulation can be swept vertically across the cross-section of the fiber 46. In an alternative embodiment, the diffractive element 43 and the optical fiber 46 can be scanned vertically rather than the lens 42.

Figure 11:
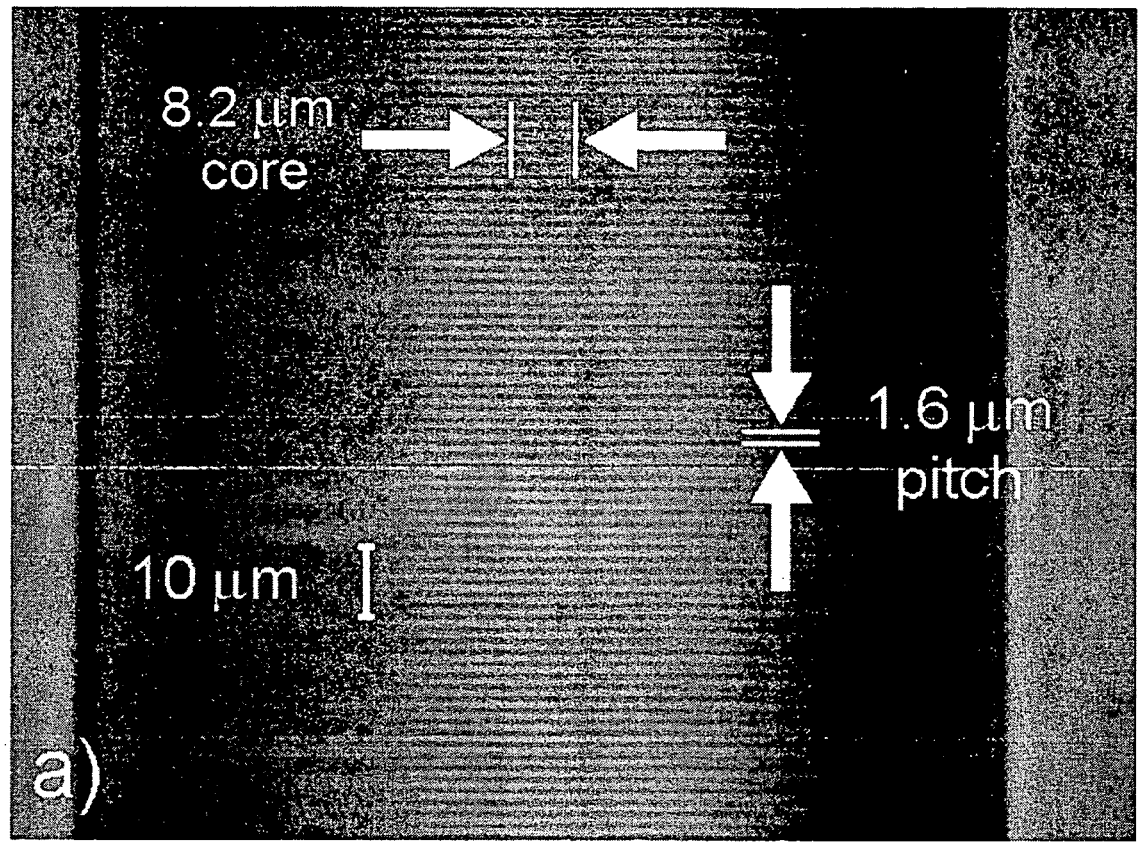

Optical microscope images of the gratings fabricated in standard non-photosensitized single mode fiber (SMF-28) with a 125 femtosecond pulse duration 800 nm beam, through a 3.213 μm pitch phase mask using the techniques disclosed here are presented in FIG. 11a. A distance 47 of 3 mm was used, however the ±1 order walk-off from the zero order occurred at distances >1.3 mm from the mask for a 125 fs pulse.

Figure 11B:
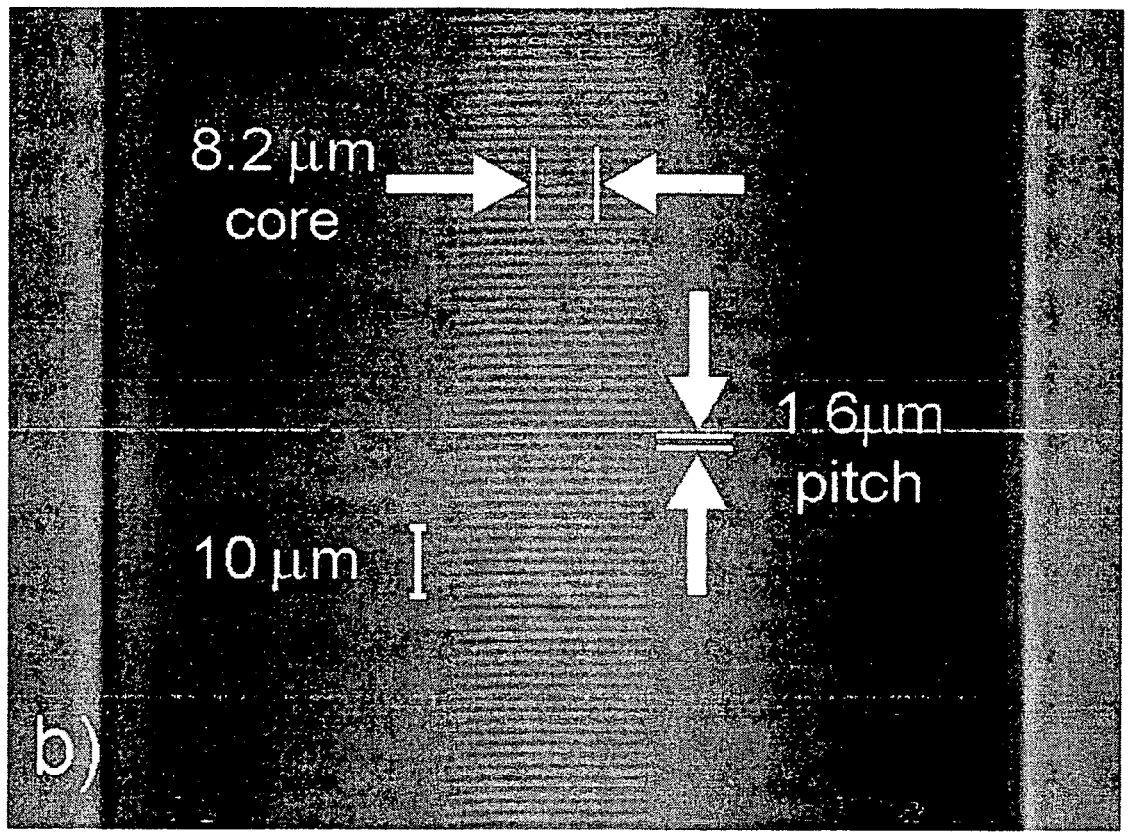

The image of FIG. 11a was taken normal to a plane defined by the femtosecond beam. FIG. 11b was taken with the grating device rotated 90° to FIG. 11a. Since the grating structure is continuous across the core-cladding interface of the optical fiber and penetrates several microns into the cladding layer, good suppression of cladding modes result.

Figure 12:
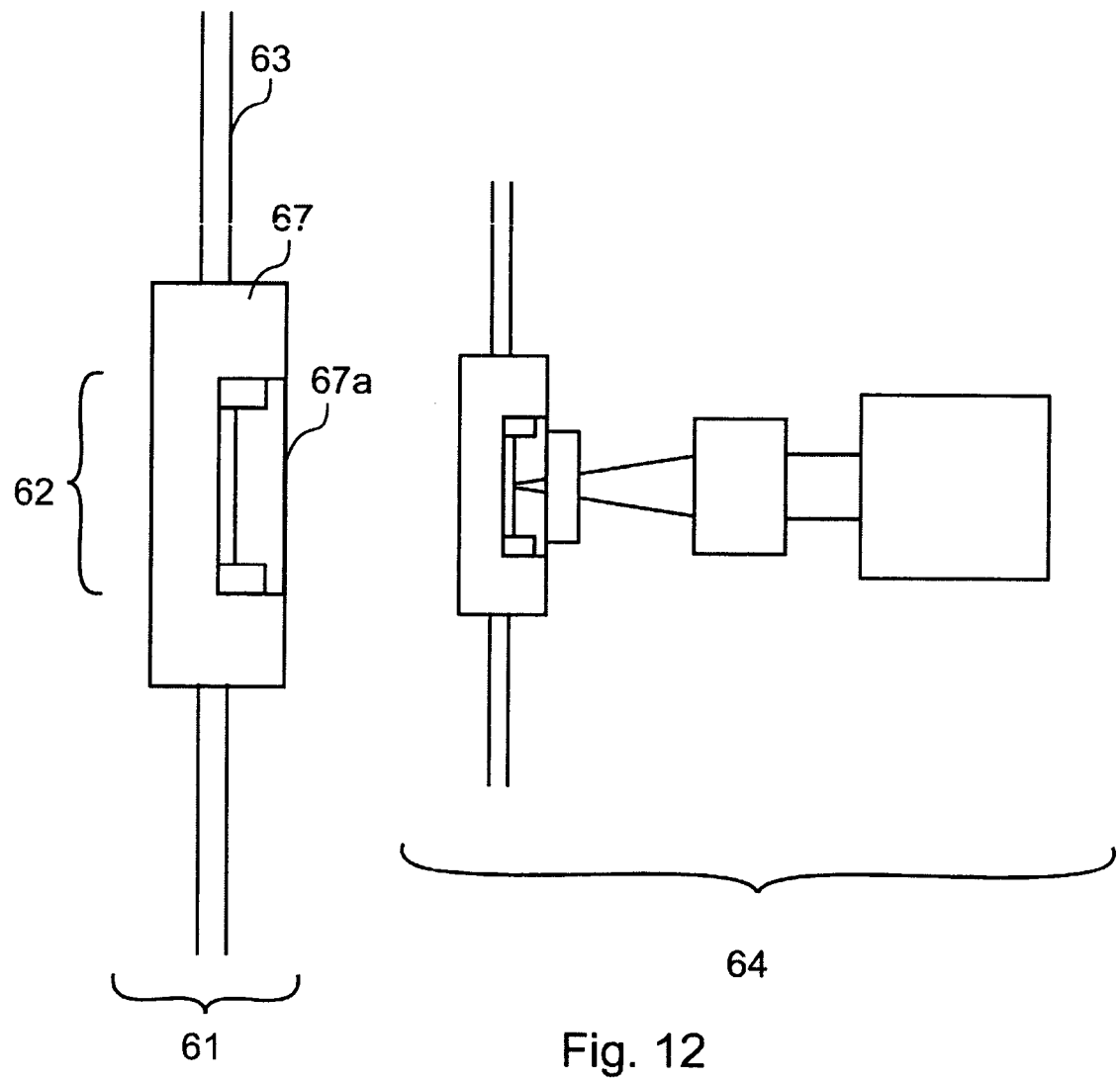
FIG. 12 is a production system according to an embodiment of the invention.
Figure 12A:
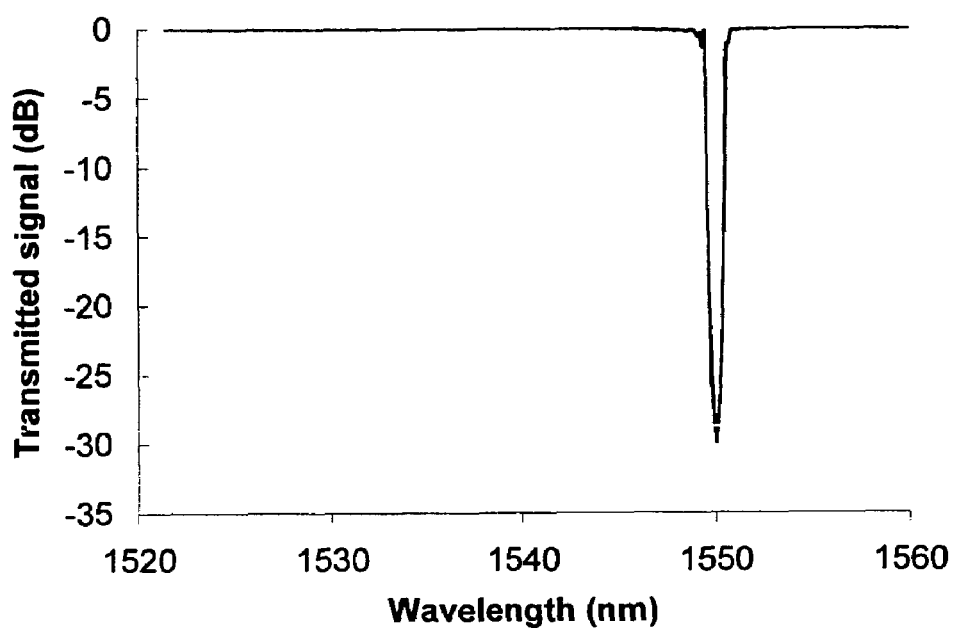
FIG. 12a is the transmission spectrum of the cladding mode suppressed grating that was induced with the femtosecond laser and the phase mask and corresponds to the grating shown in FIG. 12.
Figure 12B:
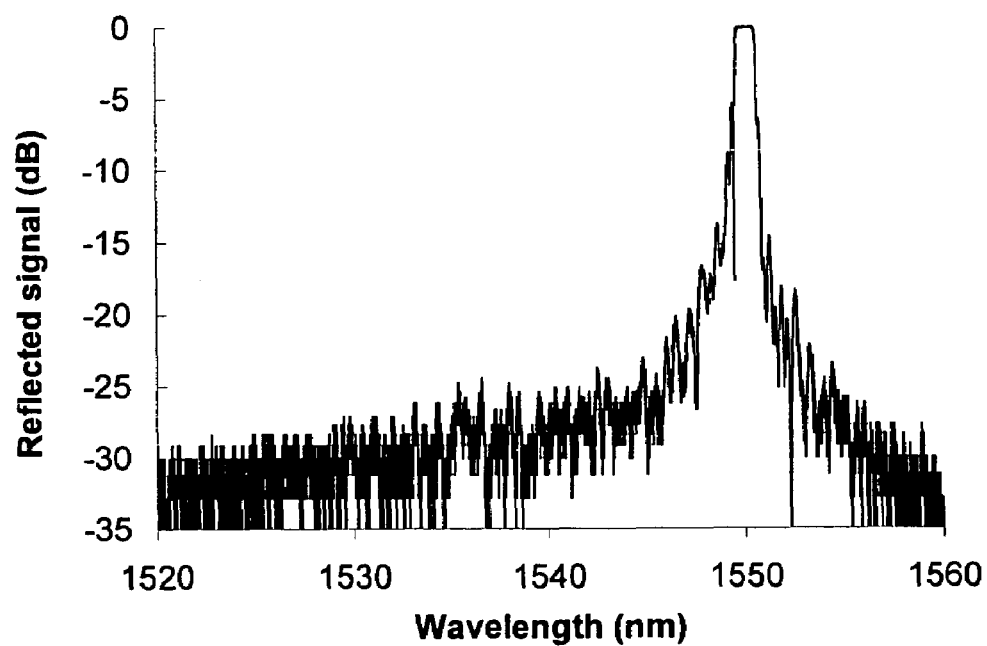
FIG. 12b is the reflection spectrum of the cladding mode suppressed grating that was induced with the femtosecond laser and the phase mask and corresponds to the grating shown in FIG. 11.
Figure 12C:
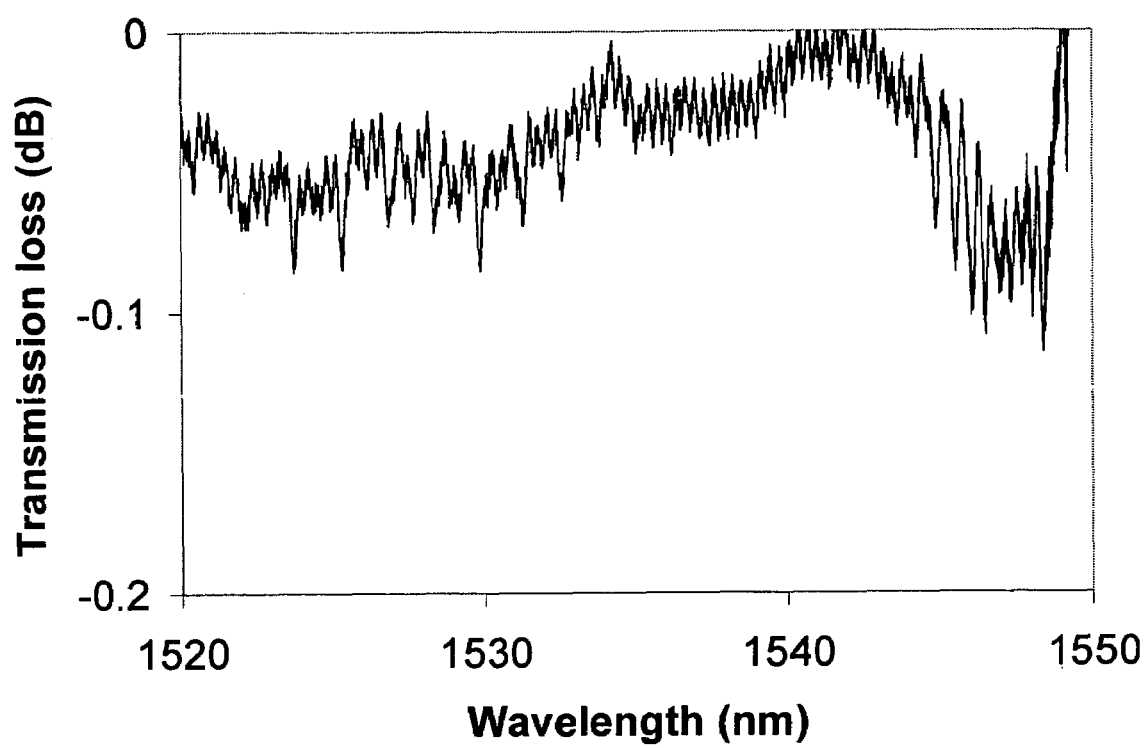
FIG. 12c is the cladding mode loss spectrum expressed as difference between the transmission spectrum FIG. 12a and 1-R reflection spectrum FIG. 12b.

FIG. 12a presents the transmission spectrum of a grating written in standard single mode fiber (SMF-28) with a 125 femtosecond pulse duration 800 nm beam, through a 3.213 μm pitch phase mask. FIG. 12b presents the reflection spectrum of the device, while the transmission loss due to cladding modes is presented FIG. 12c. The spectrum FIG. 12c) is the difference of the short wavelength side of the measured transmission spectrum FIG. 13a) with the transmission inferred from the reflection spectrum FIG. 12b). The grating device presented in FIGS. 12a, 12b and 12c displays excellent optical performance and cladding mode suppression. At the Bragg resonance $\lambda_{Bragg}$, the pitch of the grating structure in the fiber $\Lambda$ is defined by $m\lambda_{Bragg}=2n_{eff}\Lambda$ where m is the order number and $n_{eff}$ is the effective index of the fiber resulting in a third order retro-reflecting grating. The grating device has a −30 dB transmission at $\lambda_{Bragg}$ with cladding mode coupling induced loss is ~0.1 dB (FIG. 13b). The out-of-band insertion loss measured on the long wavelength side of the grating was<0.05 dB.

As a person of skill in the art will be aware, the invention need not be limited to the writing of cladding mode suppressed Bragg gratings within the waveguide core and cladding of an optical fiber. Any application that presently is facilitated by the use of UV-photosensitive cladding fiber can be envisaged without using any special fiber type and the femtosecond laser-phase mask technique disclosed here. For example in some cases it is preferable to provide a tap by writing a grating within the cladding of the optical waveguide without providing a set of interference fringes in the core. In this instance it was found to be advantageous writing the grating at a distance where 3-beam interference occurred by being near to the phase mask, grating planes can be induced at "Talbot" planes that can be on either side of the core without being in the core. Here the 0, ±1 orders would be utilized. Using precision rotation stages, the fiber could then be rotated and re-exposed. Alternatively the fabrication of a tilted or blazed grating written in the core and cladding of a fiber could be used to produce doped-fiber amplifier gain equalizing filters. By generating an asymmetry in the photosensitive profile, gratings written only in the cladding region that are not tilted could be used to create cladding modes to produce doped-fiber amplifier gain equalizing filters. Furthermore, long period gratings can be written in standard non-photosensitive telecommunications fiber by the method of this invention.

A person of skill in the art will easily envision the modification of embodiments of the invention for use in a wide variety of applications. There are several different applications and waveguide architectures into which index modulated structures in cores and cladding could be inscribed to produce useful devices. Grating structures could be easily inscribed across the cross-section of tapered optical fibers or waveguides for cladding mode suppression. The technique disclosed here would greatly facilitate the fabrication of these devices, as photosensitization through hydrogen loading would not be required and the grating structure could be impressed across the entire cross section of the taper irrespective of photosensitive doping.

The instant invention can be used for the fabrication of grating assisted fused biconic tapered coupler devices wherein a grating assisted coupler device is written across the entire the fusion region of a fused biconic tapered coupler. The invention obviates the complex costly process of photosensitization through hydrogen loading during photoinscription in photosensitive clad fiber that has been made into a fused biconic tapered coupler.

A person of skill in the art will easily envision the modification of embodiments of the invention for use in a wide variety of applications. For example, the invention is equally applicable to planar waveguide structures and buried waveguide structures.

Clearly, the use of a higher order phase mask permits more variation in the physical positioning of the target waveguide when it receives a diffracted pulse. Referring to FIG. 12, a production system for producing FBGs according to another embodiment of the invention is shown. This embodiment of the invention is specifically intended to take advantage of the reduced tolerances of a system according to the invention. In a first stage 61 of the system 60, a portion 62 of an optical fiber 63 is stripped, exposing the cladding. The stripped portion 62 is disposed in a package 67. The package includes a transparent portion 67a. In a second stage 64, the stripped portion 62 is brought into close proximity with a diffractive optical element. The diffractive optical element receives a femtosecond pulse of laser light. The femtosecond pulse is diffracted and propagates through the transparent portion 67a and forms an interference pattern within stripped portion 62 of the optical fiber 63. The intensity peaks of the interference pattern are sufficiently intense to cause a permanent change in the index of refraction in the optical fiber 63. This production method is highly advantageous because it helps to protect the exposed optical fiber during processing. Additionally, it provides flexibility in that the first stage 61 is optionally performed at a first location while the second stage 65 is performed at a second location. Optionally, an opaque covering, such as paint, is applied to the transparent portion 67a.

Figure 13A:
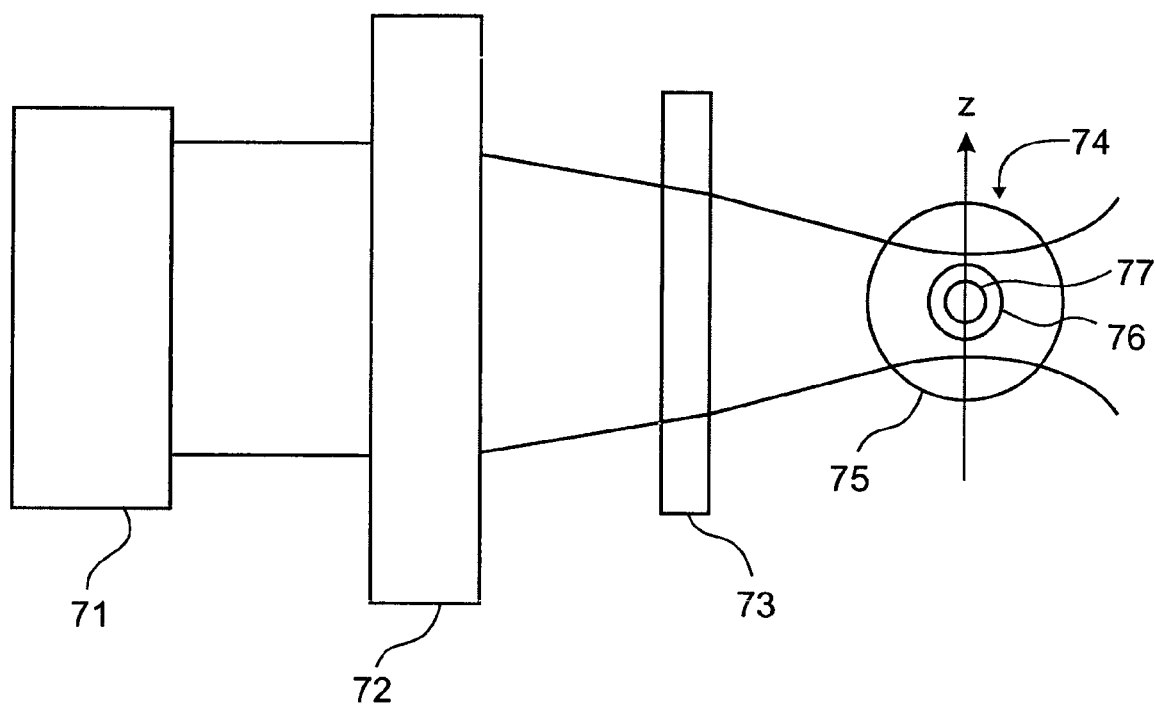
FIG. 13a is a diagram of a system according to an embodiment of the invention for writing gratings through a jacket of a waveguide.
Figure 13B:
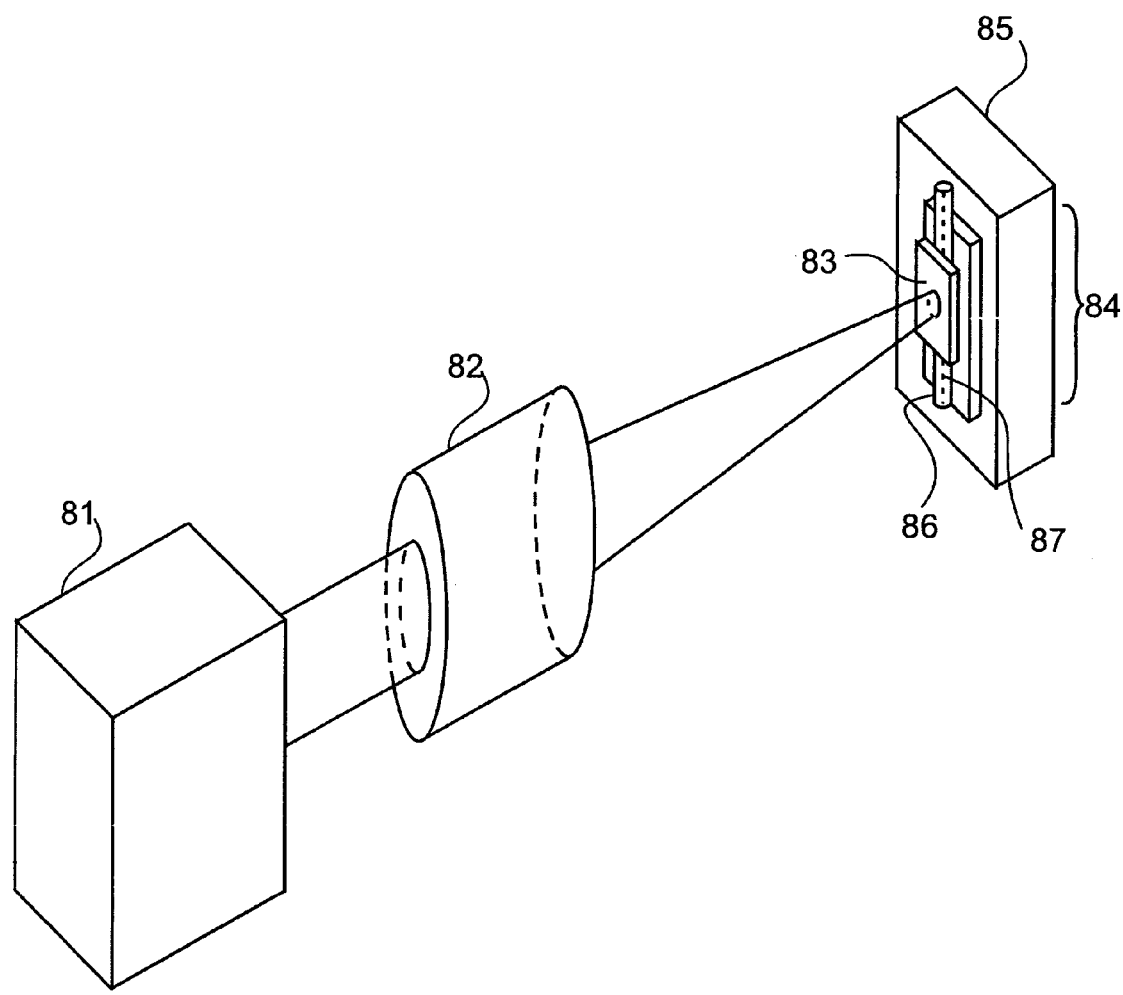
FIG. 13b is a diagram of a system according to an embodiment of the invention featuring a precision alignment stage.

Referring to FIG. 13a, an apparatus for writing a Bragg grating into an optical fiber according to an embodiment of the invention is shown. The apparatus comprises a femtosecond laser source 71, a lens 72, a diffraction element 73, and a target waveguide 74. The target waveguide 74 includes a jacket 75, a cladding 76 and a waveguide core 77. The femtosecond laser source 71 provides pulses of laser light having a predetermined range of wavelengths. The material of the jacket 75 is transparent to this predetermined range of wavelengths. In use, the femtosecond laser source 71 provides a pulse of laser light. The pulse of laser light propagates to the lens 72 that focuses the pulse of laser light. The pulse of laser light is incident a surface of the diffractive element 73. A portion of the pulse laser light propagates to the target waveguide 74 and is incident thereon. Since the jacket 75 is transparent to the range of wavelengths of the femtosecond laser source 71 the portion of the pulse of laser light penetrates the jacket 75 and forms an interference fringe pattern in the waveguide core 77. The intensity of the peaks of the interference fringe pattern is sufficient to cause a change in the index of refraction of the waveguide core 77. Thereby forming a Bragg grating. There are prior-art examples of fabrication of UV-induced fiber gratings where special polymer jackets are used that are transmissive to the UV-light. Aspell et al in U.S. Pat. No. 5,620,495 disclose a method of fabrication of UV-induced fiber Bragg gratings through a single UV-transmissive polymer coating while Starodubov in U.S. Pat. No. 6,222,973 teaches a similar method of UV-induced grating fabrication but with optical fiber being protected by a multi-layer polymer coating. In this embodiment of the invention no special polymer coating is required and standard coatings with are transmissive to the infrared radiation are used.

Referring to FIG. 13b, another embodiment of the invention is shown. This embodiment comprises a femtosecond laser source 81, a lens 82, an phase mask 83, a target waveguide 84, and an alignment stage 85 supporting precision alignment. The target waveguide 84 includes a waveguide core 86 and a waveguide cladding 87. In use, the femtosecond laser source 81 provides a pulse of laser light. The pulse of laser light propagates to the lens 82 that focuses the pulse of laser light. The focused pulse of laser light is incident a surface of the phase mask 83. A portion of the pulse propagates to the target waveguide 84 and is incident thereon. The portion of the pulse forms an interference fringe pattern in the target waveguide 84. The intensity of the peaks of the interference fringe pattern is sufficient to cause a change in the index of refraction of the target waveguide 84. The alignment stage 85 is sufficiently precise to vary the location of the interference fringe pattern by setting the alignment stage 85 prior to producing pulses from the femtosecond laser source 81. Thus, in a first mode of operation a set of fringes corresponding to an interference fringe pattern is written into the waveguide core 86 and the waveguide cladding 87 of the target waveguide 84. In a second mode of operation a set of fringes is written to the waveguide cladding 87 absent writing fringes to the waveguide core 86. In a third mode of operation, the alignment stage provides an angle between the phase mask 83 and the waveguide core 86 thereby producing a grating that is blazed. In a fourth mode of operation, the focused pulse of laser light is incident a surface of the phase mask 83. A portion of the pulse propagates to the target waveguide 84 and is incident thereon. The portion of the pulse does not form an interference fringe pattern in the target waveguide 84 but instead produces an intensity modulation based on the binary output from the phase mask.

Figure 14:
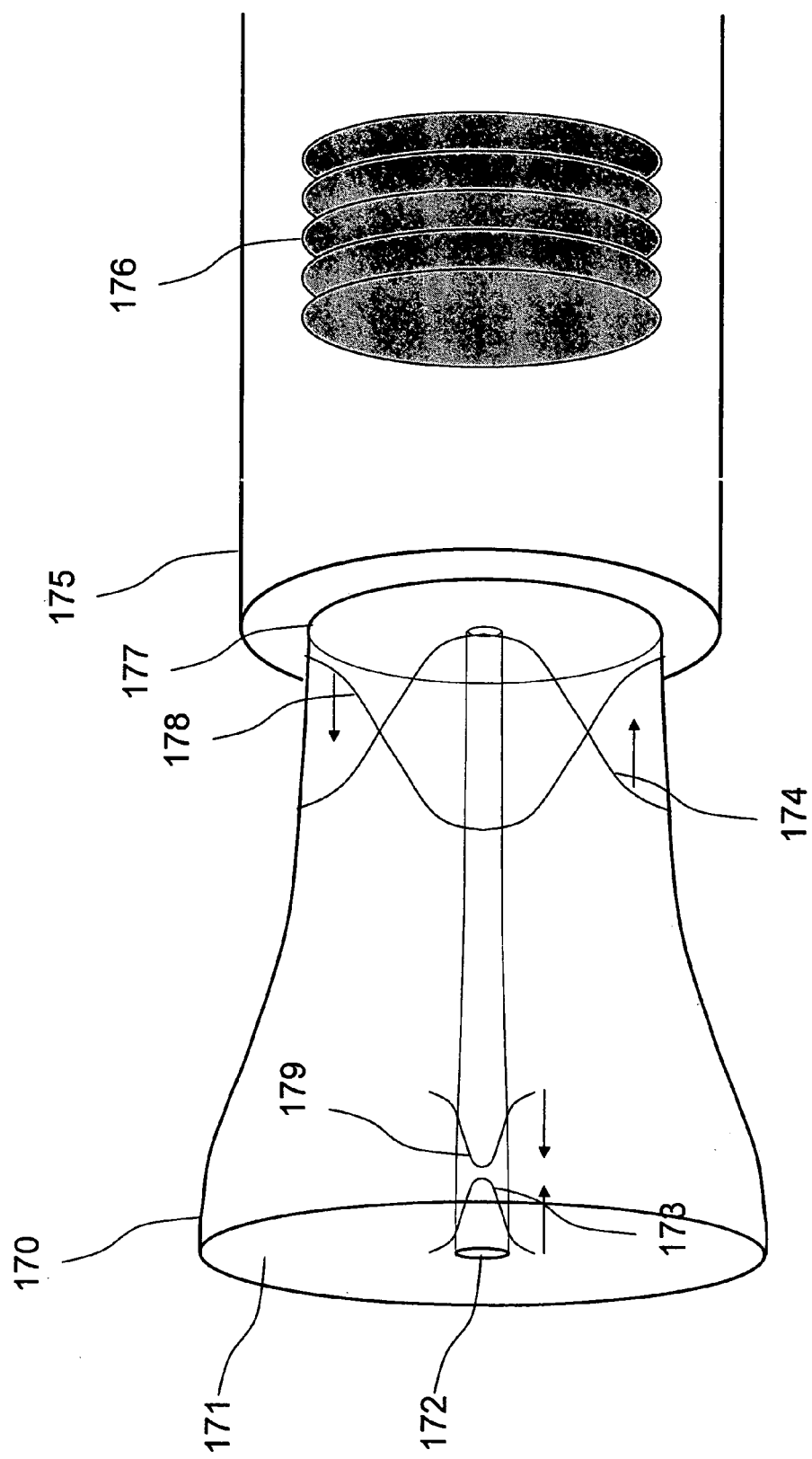
FIG. 14 shows a schematic diagram of the mode field expansion as a result of tapering.

The embodiment of the invention described with reference to FIG. 14 is also highly beneficial because it supports a "step and repeat" production process. The step and repeat production process is useful in the production of very long fiber gratings. Such gratings are commonly used in wavelength dispersion compensation systems used in DWDM optical networks. The step and repeat production process is also useful for producing localized grating structures along a length of the fiber, such as sampled gratings. Other suitable applications will be apparent to one of skill in the art. A person of skill in the art will be aware that other embodiments of the invention such as, for example, the embodiment described with reference to FIG. 11 will also support a step and repeat process.

Due to the rapid but short-lived multi-photon ionization process, very high index variations are possible without prior sensitization of the fibers or waveguides with, for example, hydrogen or deuterium. In addition, the highly localized index changes produced by the interference fringes from the phase mask are similar to single shot UV-induced damage gratings in that the refractive index change is permanent up to the glass transition temperature of the fiber. Thus, in a process according to the invention, high spectral quality gratings with very high index modulations are easily produced. Beneficially, these gratings are also robust at high temperatures. These advantages make such a process particularly well suited to high volume manufacturing as it reduces the need for additional processing steps. Additionally, since the index changes produced are relatively high a very high quality Bragg grating is produced.

As was mentioned heretofore, this invention can be used for the fabrication of grating assisted fused biconic tapered coupler devices wherein a grating assisted coupler device is written across the entire the fusion region of a fused biconic tapered coupler. Referring to FIG. 14, the fundamental $LP_{01}$ mode 173 is propagating in the core region 172 of a single mode fiber until it reaches a tapered region of the fiber 170. As the fiber is tapered down, the V number of the single mode decreases as fiber is tapered which results in cladding-air guided single mode 174. This expanded mode excites the fundamental $LP_{01}$ of the multimode sapphire fiber 175 which propagates into the fiber and interacts with the Bragg grating 176. Optimal coupling to the fundamental $LP_{01}$ mode of the sapphire occurs when the outer diameter of the sapphire fiber 175 is the same as the outer diameter of the tapered end face 177. The Bragg grating reflection is coupled into a number of reflected low order modes however the mode consistent with the $LP_{01}$ of the taper 178 is guided and as the taper size increases it becomes core guided again as V>0.84 179.

Figure 15:
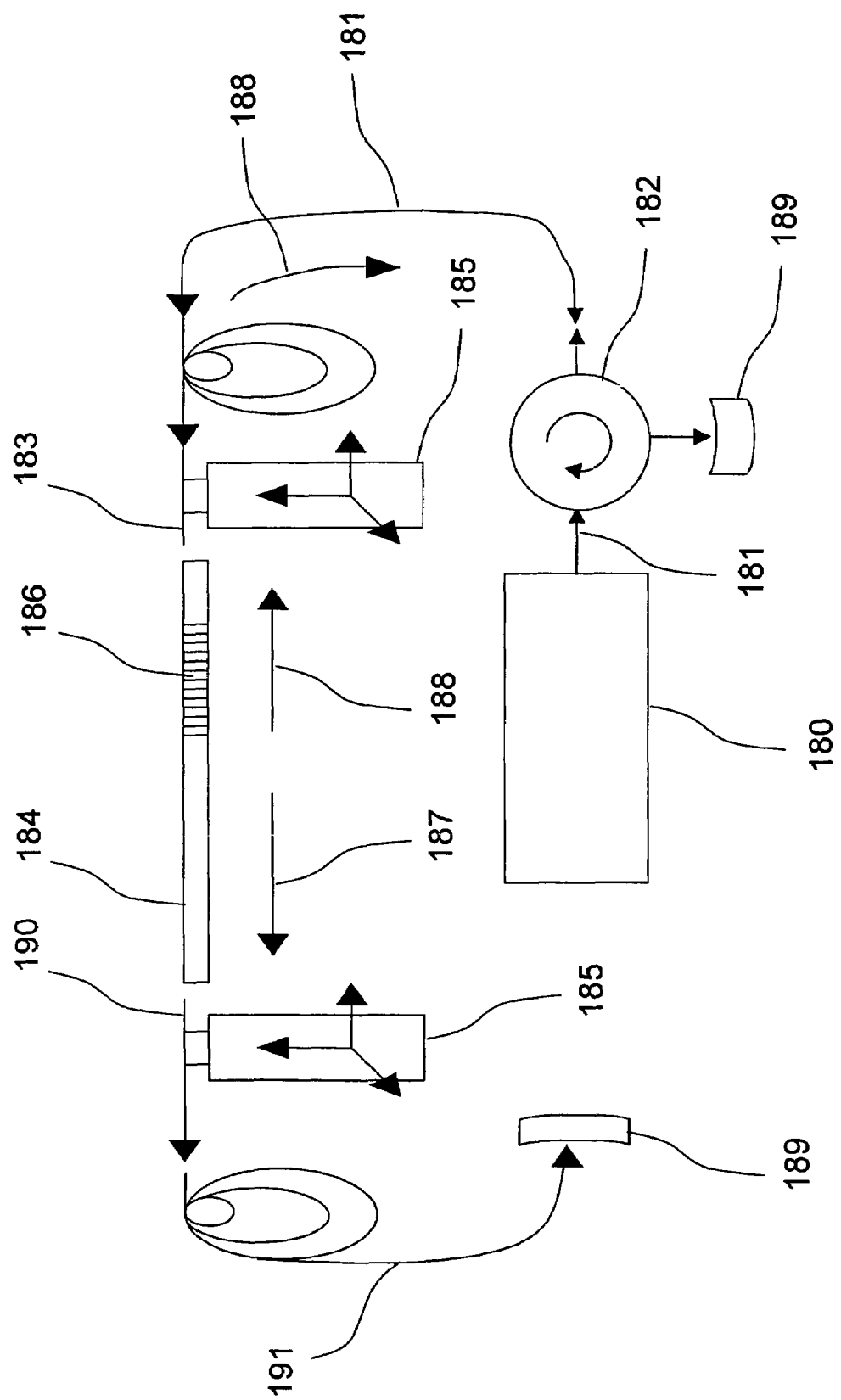
FIG. 15 is a schematic diagram of the monitoring set up of the multimode sapphire fiber Bragg grating which was interrogated using the fiber tapers.

Referring to FIG. 15, the single mode interrogation of the sapphire fiber grating is as follows: Light from a tunable laser 180 is launched into a single mode fiber 181 that passes through an optical circulator 182. The single mode fiber 181 is then tapered 183 to produce an expanded mode field as shown in FIG. 14. The expanded mode is then launched into the sapphire fiber 184 using a 5-axis precision translation stage 185 and propagates along the fiber until it reaches the Bragg grating structure 186. If the incident wavelength is not at the Bragg resonance then fundamental mode continues to propagate 187. If the incident wavelength of the mode is at the Bragg resonance, then the interaction of the incident mode with the Bragg grating produces back reflecting modes 88 which are then re-coupled into the taper 183 and become a single mode response when they leave the tapered region back into the standard fiber 181. This reflected signal then passes through the circulator 182 onto the photo-detector 189. The transmitted signal 187 can then couple to an output taper 190 which is coupled to the sapphire fiber 184 with the aid of another 5-axis precision translation stage 185. The large mode field coupled by the output taper 190 becomes a core guided mode in the single mode fiber 191 when the V>0.84. The signal is then fed into a photo detector 189. For improved signal strength at the expense of a single mode response, the output taper 190 and single mode fiber 191 can be replaced by a multimode fiber.

Figure 16:
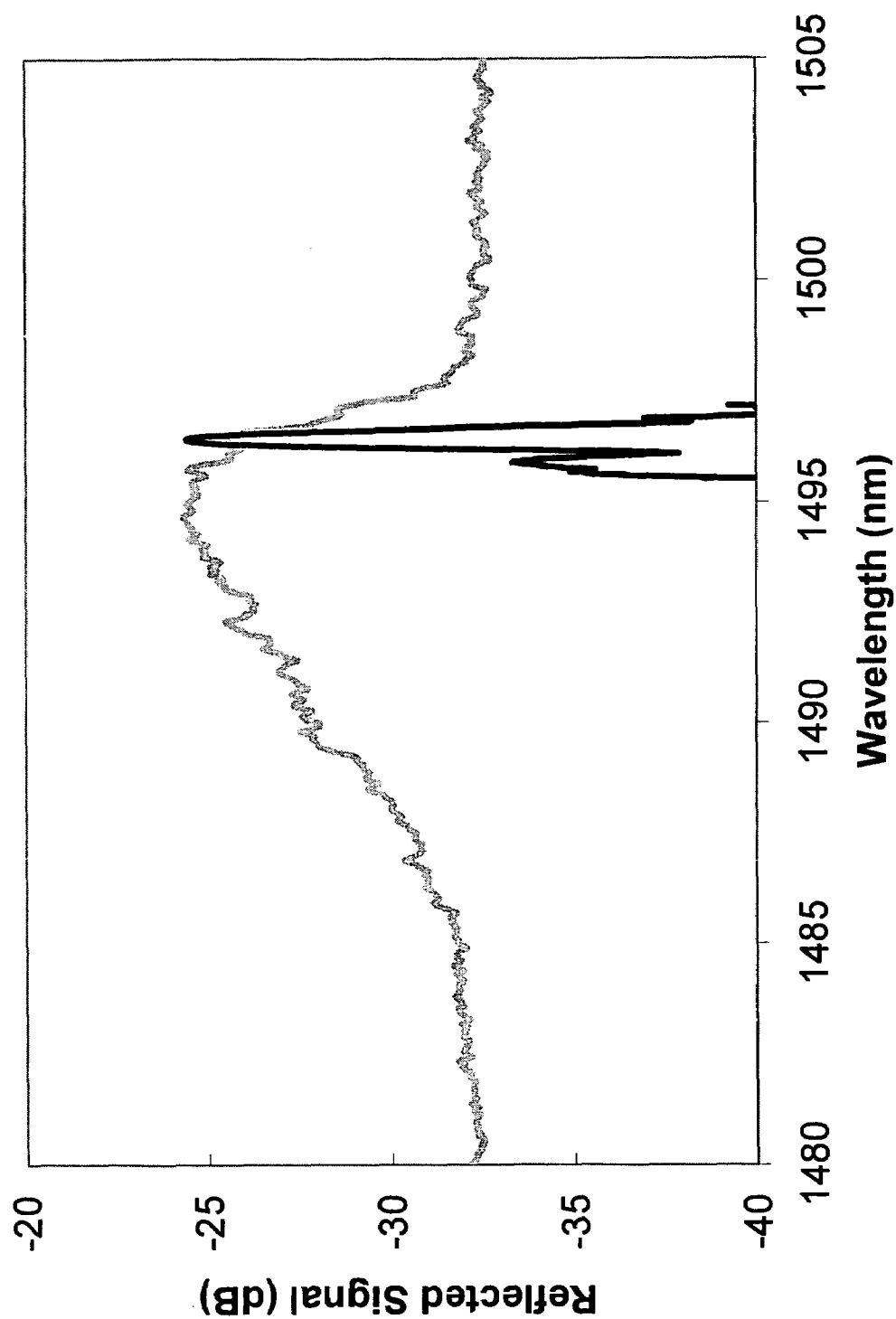
FIG. 16 shows a comparison between the multimode and single mode response of the grating at room temperature.

Referring to FIG. 16, the multimode reflection from the Bragg grating is collected with a 100 micron core multimode fiber and a coupler (gray trace) is compared with the single mode reflection collected using a single mode fiber with a cut off wavelength of 800 nm tapered down to 60 µm and an optical circulator (black trace)

Figure 17:
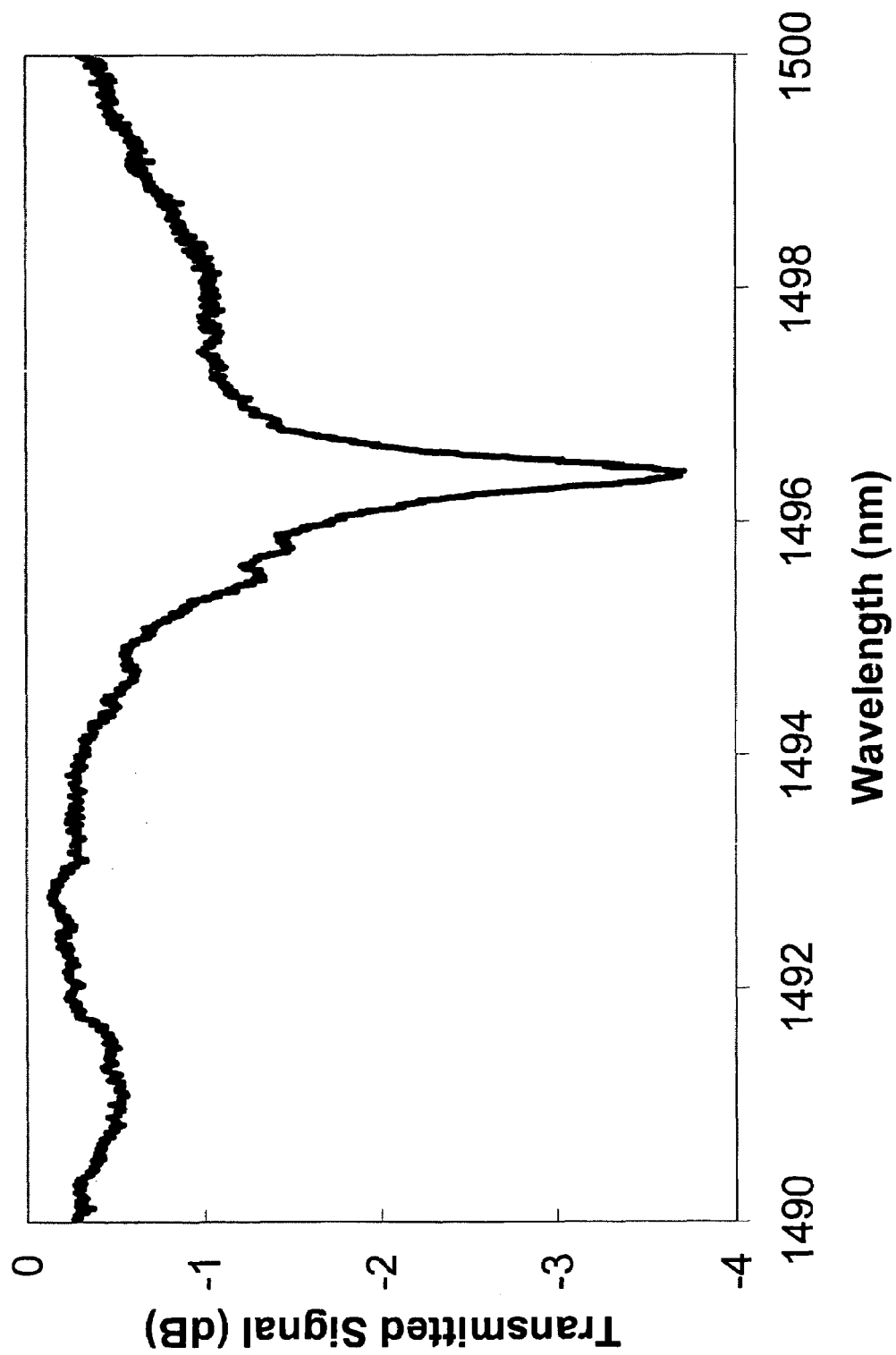
FIG. 17 shows a single mode transmission response with both input and output fibers to the sapphire fiber being tapered.

If the output coupler as shown in FIG. 14 is a fiber tapered to mode matched to the expanded $LP_{01}$ transmitted through the fiber, then the light coupled into the taper produces a single mode response as shown in FIG. 17.

Within this specification, the phrase having a glass transition temperature substantially higher than silica is to mean at least 10% higher than the glass transition temperature of silica.

A wide variety of alternative embodiments of the invention are easily envisioned by a person of skill in the art. For example, other embodiments of the invention feature an amplitude mask instead of a diffractive optical element. If the amplitude mask is provided sufficiently close to the target waveguide then a grating is produced absent diffraction of the electromagnetic radiation.

Instead of using a phase mask to inscribe pure 2-beam interference patterns selectively in the core and cladding of waveguide, a holographic technique of inducing a refractive index change in materials could be used to selectively induce index changes in the core and cladding of optical fibers and waveguides as disclosed herein.

Of course the grating can be a single contiguous uniform grating that spans the core of a sapphire fiber or, alternatively the grating can be comprised of two gratings having same or similar characteristics or wherein the gratings have different characteristics, such as a different index modulation, position or pitch from the cladding region.

Within this specification, actinic radiation is to be understood to be radiation that causes a chemical photorefractive index change in an optical material as opposed to a physical process that appears to cause the refractive index change in the materials not due to the dopant dependant mechanisms occurring with UV-induced index change, namely color center formation. In accordance with this invention, the predominant refractive index change is due to the creation of free electrons through non-linear absorption and multi-photon ionization of bound charges; this may be followed by avalanche ionization and localized dielectric breakdown as these free electrons are accelerated by the intense but short time duration laser field. This leads to a localized melting and restructuring of the material and a concurrent increase in the index of refraction.

In summary this invention provides a sapphire fiber having a retro-reflective grating therein. Such high temperature stress-temperature sensor based on retro-reflecting Bragg gratings are required for numerous applications. There are similar fiber grating sensors in standard fiber that are used at lower temperatures in the oil and gas industry. This new sensor is optionally incorporated into smart skin structures that are exposed to high temperatures, for example the Space Shuttle.

A further embodiment not described heretofore, but in accordance with an aspect of the invention provides a means of producing a guide or guiding region, preferably throughout the length of the sapphire fiber but not limited thereto. By inducing a localized grating structure along the length of the fiber such that the Bragg grating acts as a waveguide for the claddless rod or fiber of sapphire for wavelengths of light below or above the Bragg resonance. This is done by having the effective index of the grating structure larger than the surrounding core region.

It should be understood that the term sapphire fiber shall include other sapphire waveguide structures such as waveguides having a square or rectangular cross-section.

What is claimed is:

1. A retro-reflective sensor for sensing at least one of mechanical, chemical and temperature related information, comprising:
   an optical waveguide formed of a core material, along a length thereof, wherein said optical waveguide has a Bragg grating formed in the same core material suitable for use in-situ in a high temperature environment, said optical waveguide having a glass transition temperature substantially higher than that of silica, wherein the Bragg grating formed within the core material of the optical waveguide is formed of alternating high and low refractive index regions of the core material of the optical waveguide.

2. A retro-reflective sensor as defined in claim 1, where said Bragg grating is written into the same core material with short pulsed electromagnetic radiation where the pulse duration of said short pulsed electromagnetic radiation is less than 500 picoseconds.

3. A retro-reflective sensor as defined in claim 2, wherein the optical waveguide has a glass transition temperature greater than 2000 degrees C.

4. A retro-reflective sensor as defined in claim 3, wherein the optical waveguide consists essentially of sapphire or zirconia and is in the form of an optical fiber, absent a cladding region, and wherein the Bragg grating is written along the interior of the waveguide and substantially through a cross section thereof.

5. A retro-reflective sensor as defined in claim 1, wherein the optical waveguide consists essentially of a crystalline material.

6. A retro-reflective sensor as defined in claim 4, wherein the electromagnetic radiation is provided through a phase mask.

7. A sensing system comprising the retro reflector sensor defined in claim 3 further comprising:
   a light source for emitting a selected plurality of wavelengths of light, optically coupled to an end of the waveguide, wherein said waveguide is an optical fiber, said light source for transmitting said light into said fiber;
   a detector optically coupled with the Bragg grating for receiving reflected light from said grating; and,
   means for analyzing a spectral response of said reflected light from said grating.

8. A sensing system as defined in claim 7 wherein the optical waveguide is a multimode fiber, said sensing system further comprising a tapered single mode optical fiber optically coupled to the multimode optical fiber for predominantly, exciting a fundamental mode of the multimode fiber the single mode tapered fiber having a normalized frequency V<1 to produce a single mode response from the multimode fiber.

9. A retro-reflective sensor as defined in claim 1 for sensing an index of refraction of the environment, wherein the waveguide has only a core and is absent a cladding.

10. A retro-reflective sensor as defined in claim 1, wherein the optical waveguide is coupled to a single mode optical fiber having a tapered portion for exciting a fundamental mode of the optical waveguide.

11. A retro-reflective sensor for sensing at least one of mechanical, chemical and temperature related information as defined in claim 2 further comprising a length of single mode fiber optically coupled to the optical waveguide for launching single mode light thereinto.

12. A retro-reflective sensor as defined in claim 11 wherein the single mode optical fiber is a tapered fiber having a taper in a region thereof for limiting a number of modes launched into the waveguide.

13. A sensing system as defined in claim 7 wherein the optical waveguide is a multimode fiber, said sensing system further comprising a single mode optical fiber optically coupled to the multimode optical fiber for providing single mode light thereto, wherein the single mode fiber is orders of magnitude longer than the multimode optical fiber.

14. A retro-reflective sensor as defined in claim 3, wherein the optical waveguide consists essentially of sapphire or zirconia and is in the form of an optical fiber, absent a cladding region, and wherein the Bragg grating is written along the surface of the waveguide producing a surface relief structure along its length.

15. A retro-reflective sensor as defined in claim 1 wherein the Bragg grating is written along a length of the waveguide to produce a guiding region for wavelengths above or below the Bragg resonance wavelength.

16. A retro-reflective sensor as defined in claim 1 wherein the optical a portion of the core material of the optical waveguide has the Bragg grating inscribed therein and wherein a portion of the core material of the optical waveguide is absent the Bragg grating.

* * * * *